(12) United States Patent
Otake

(10) Patent No.: US 7,881,596 B2
(45) Date of Patent: Feb. 1, 2011

(54) IMAGE FLUCTUATION CORRECTION DEVICE

(75) Inventor: Yoshichi Otake, Yokohama (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 29 days.

(21) Appl. No.: 12/227,692

(22) PCT Filed: May 10, 2007

(86) PCT No.: PCT/JP2007/059656

§ 371 (c)(1),
(2), (4) Date: Nov. 25, 2008

(87) PCT Pub. No.: WO2007/141986

PCT Pub. Date: Dec. 13, 2007

(65) Prior Publication Data

US 2009/0175608 A1   Jul. 9, 2009

(30) Foreign Application Priority Data

May 26, 2006   (JP) .............................. 2006-146970

(51) Int. Cl.
*G03B 17/00* (2006.01)
*H04N 5/228* (2006.01)
*G02B 27/64* (2006.01)

(52) U.S. Cl. ..................... 396/55; 348/208.8; 359/557

(58) Field of Classification Search .................. 396/55; 348/208.8, 219.1; 359/557, 831, 837
See application file for complete search history.

(56) References Cited

U.S. PATENT DOCUMENTS

| | | | | |
|---|---|---|---|---|
| 5,461,513 A | * | 10/1995 | Maruyama | ................... 359/837 |
| 5,541,693 A | * | 7/1996 | Enomoto | ..................... 396/53 |
| 5,890,019 A | | 3/1999 | Suzuki et al. | |
| 6,091,448 A | * | 7/2000 | Washisu et al. | ........ 348/208.16 |
| 6,243,132 B1 | | 6/2001 | Lee et al. | |
| 6,987,529 B1 | * | 1/2006 | Ito | ........................... 348/208.2 |

FOREIGN PATENT DOCUMENTS

| | | |
|---|---|---|
| GB | 2 268 285 A | 1/1994 |
| JP | 60-027278 | 2/1985 |
| JP | 63-169614 | 7/1988 |
| JP | 03-094214 | 4/1991 |
| JP | 04-352124 | 12/1992 |

(Continued)

*Primary Examiner*—W. B. Perkey
*Assistant Examiner*—Noam Reisner
(74) *Attorney, Agent, or Firm*—The Nath Law Group; Jerald L. Meyer; Sungyeop Chung

(57) ABSTRACT

An image fluctuation correction device includes a shake detecting means 5 for detecting a shake occurring in a photographic device, two movable refraction elements 10A, 10B arranged on an incident light path to an optical lens 3 to change a direction of refraction of incident light on the optic lens, two rotating means 4A, 4B for rotating each of the two movable refraction elements 10A, 10B about an optical axis within a predetermined movable range, a rotating control amount calculating means 6A for calculating rotating control amounts of the two rotating means 4A, 4B so as to cancel the shake detected by the shake detecting means, and rotating control means 6B for controlling the two rotating means 4A, 4B on the basis of the rotating control amounts calculated by the rotating control amount calculating means 6A.

3 Claims, 23 Drawing Sheets

FOREIGN PATENT DOCUMENTS

| | | |
|---|---|---|
| JP | 6-70220 A | 3/1994 |
| JP | 6-250099 A | 9/1994 |
| JP | 08-240831 | 9/1996 |
| JP | 10-048686 | 2/1998 |
| JP | 10-254008 | 9/1998 |
| JP | 11-146260 | 5/1999 |
| JP | 2003-207813 | 7/2003 |
| JP | 2004-301939 | 10/2004 |

* cited by examiner

FIG. 3
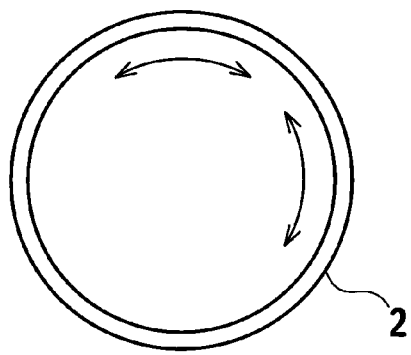
(a)
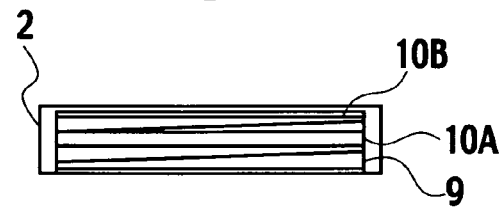
(b)
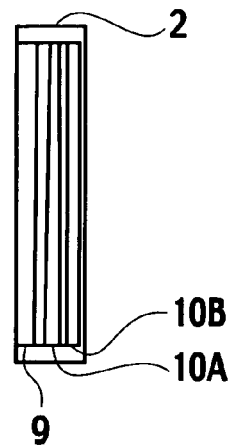
(c)
FIG. 4
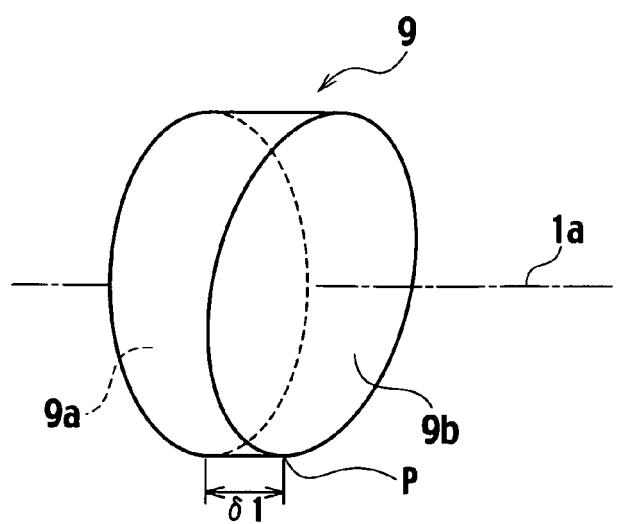

FIG. 6
(a)
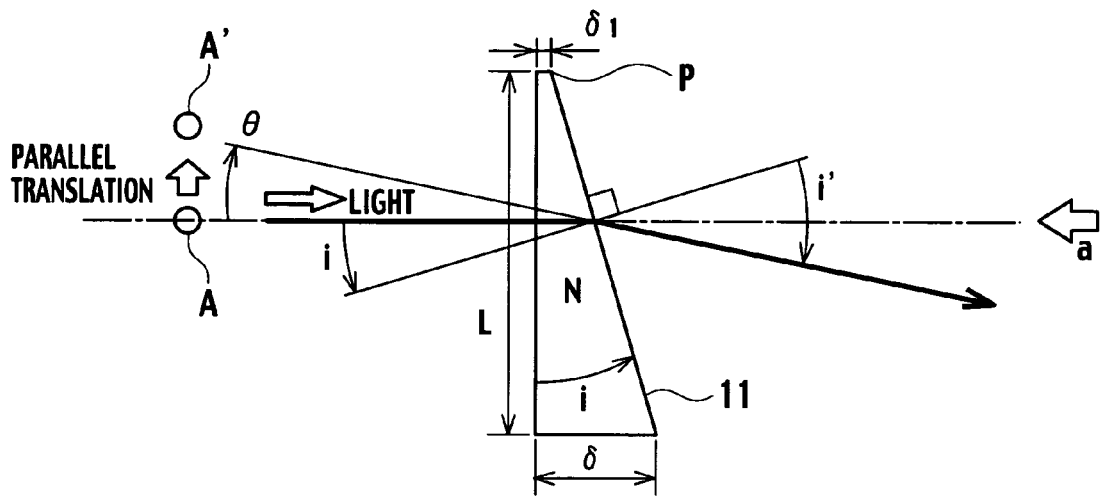
(b)
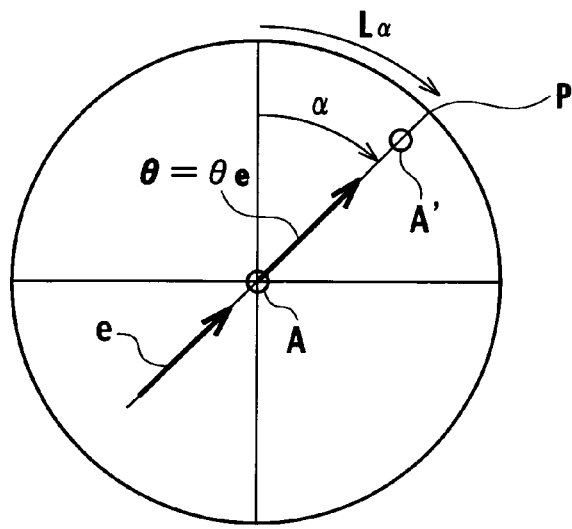

FIG. 7
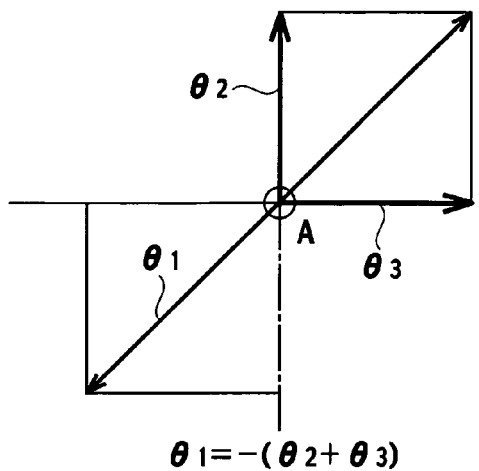
$\theta_1 = -(\theta_2 + \theta_3)$
FIG. 8
(a)
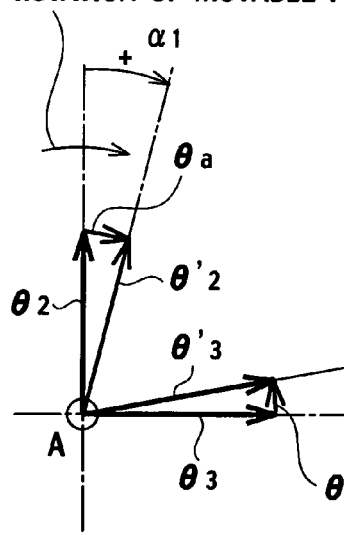
(b)
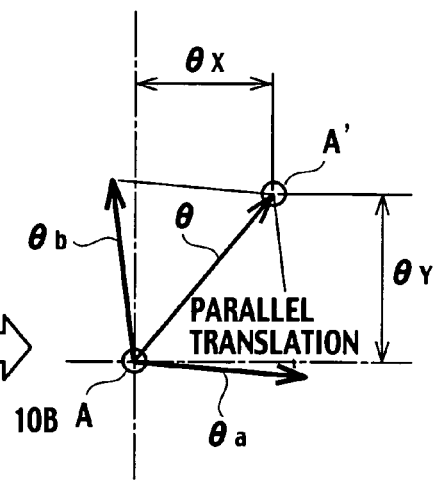

FIG. 10
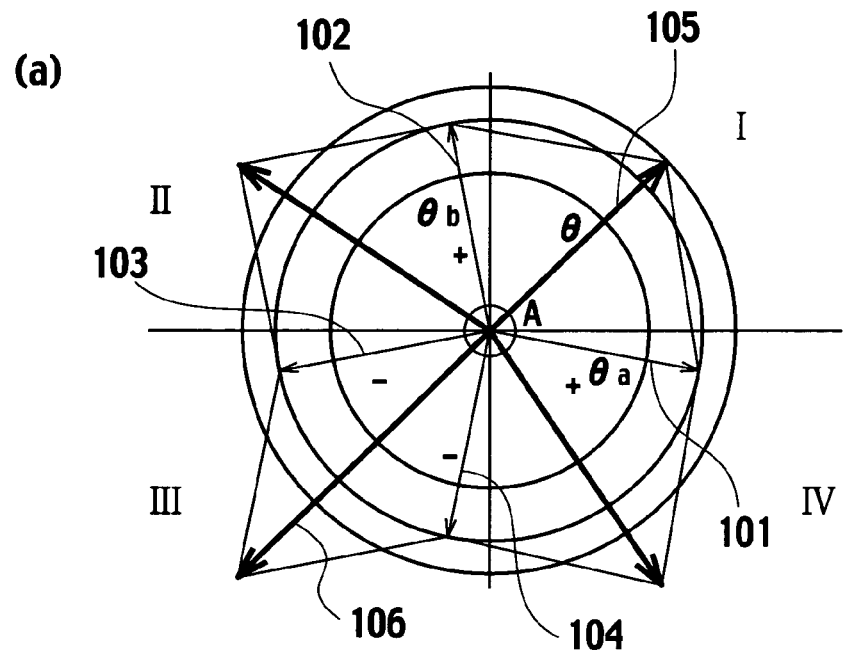
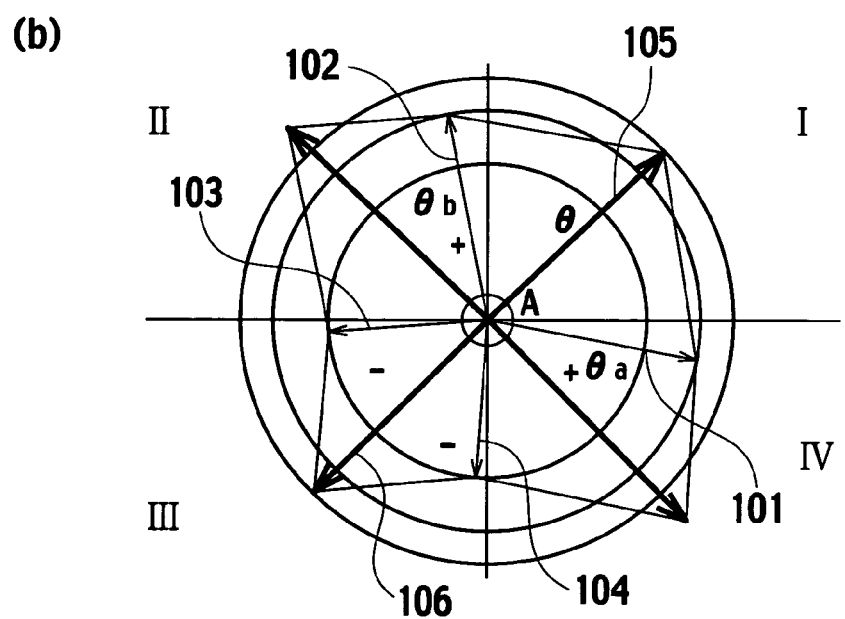

FIG. 11
(a)
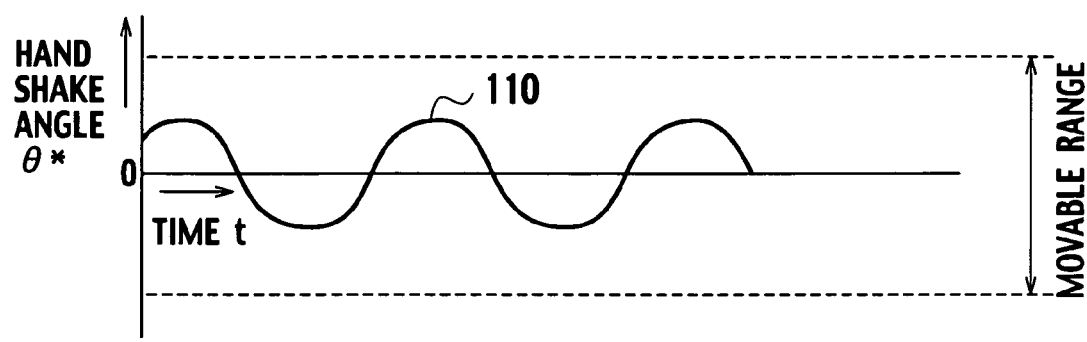
(b)
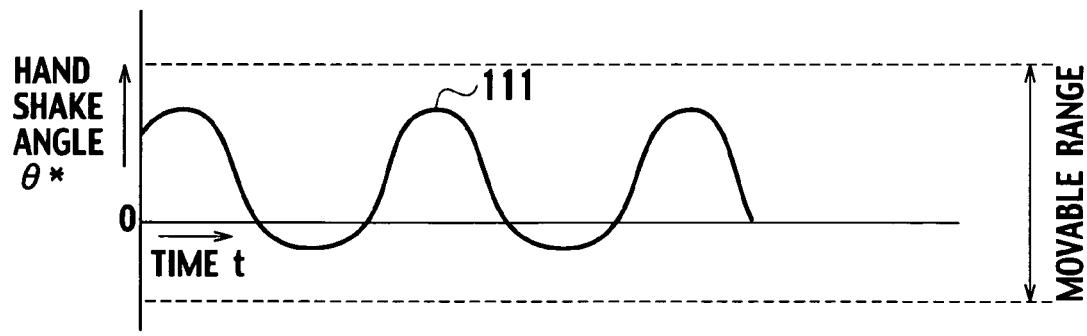

FIG. 12
(a)
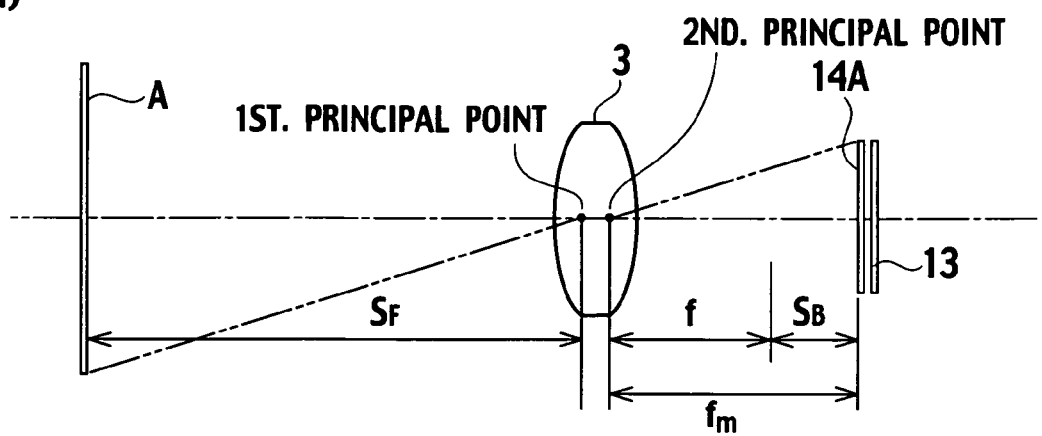
(b)
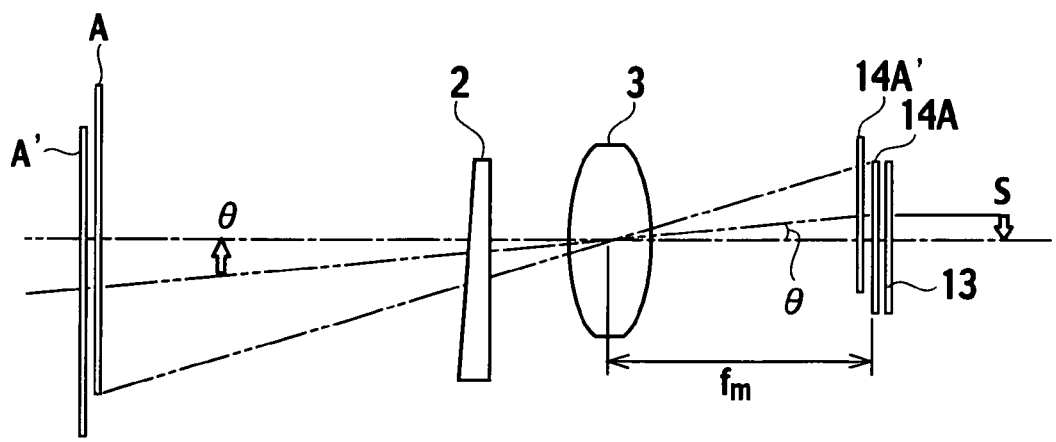

FIG. 13
(a)
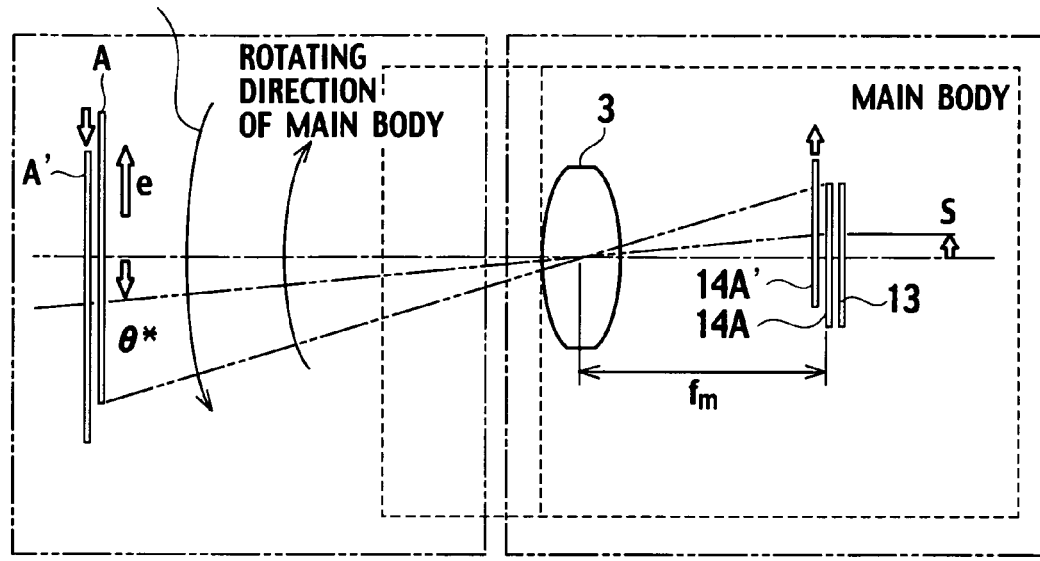
(b)
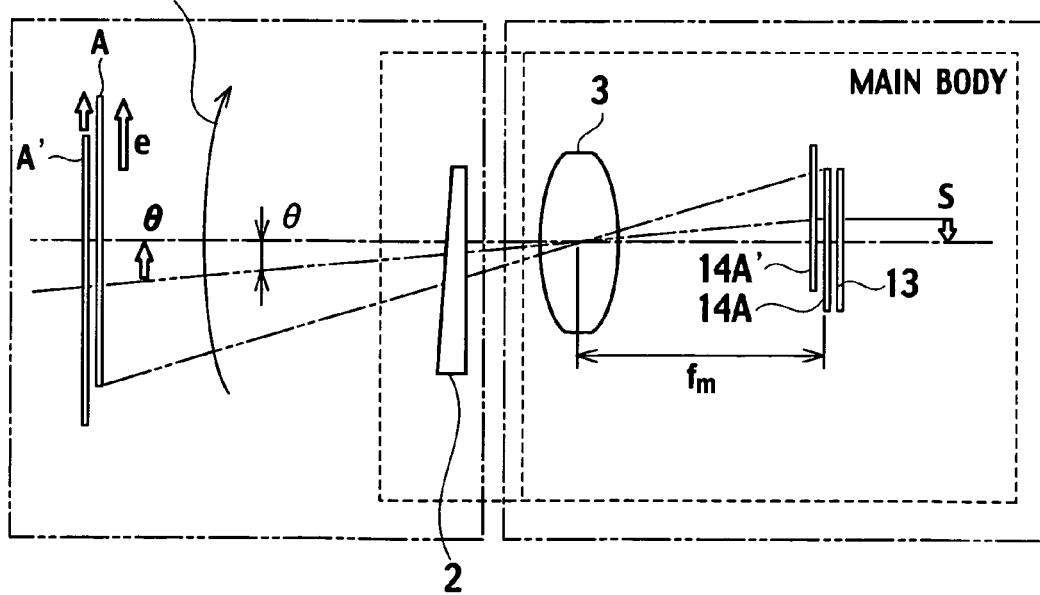

FIG. 17
(a)
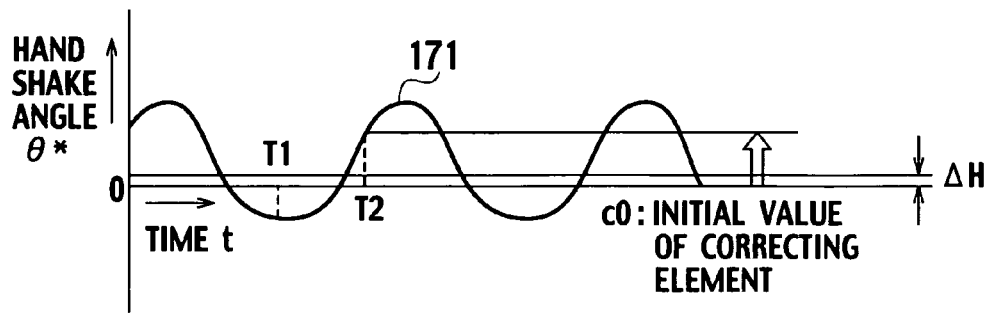
(b)
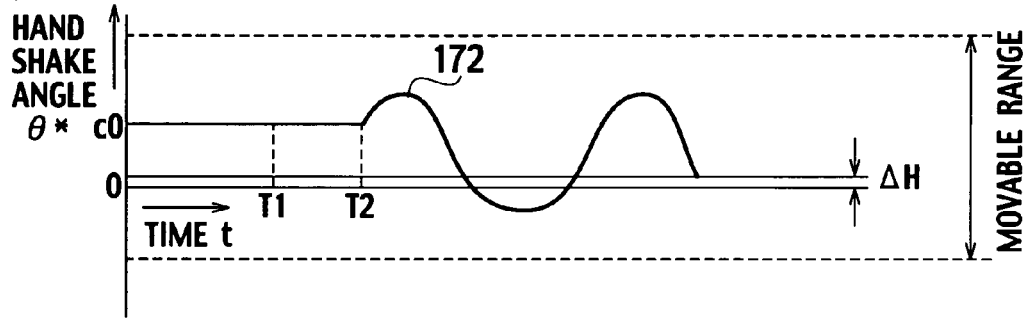
FIG. 18
(a)
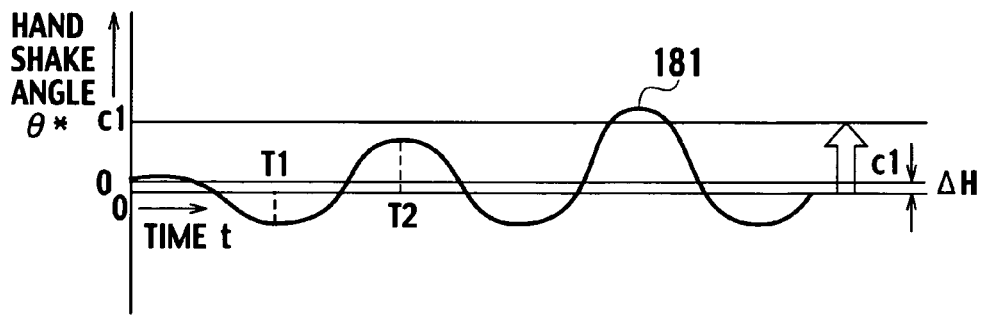
(b)
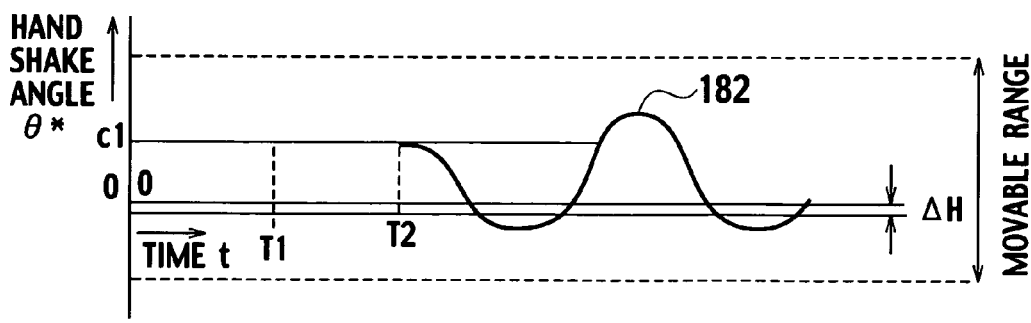

FIG. 19
(a)
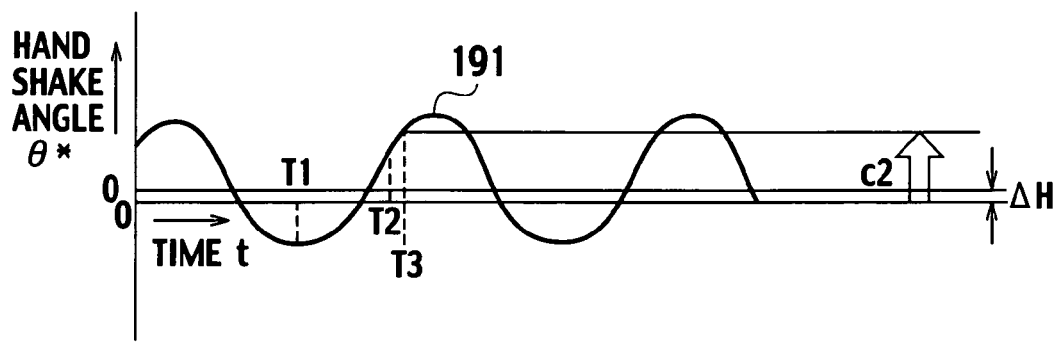
(b)
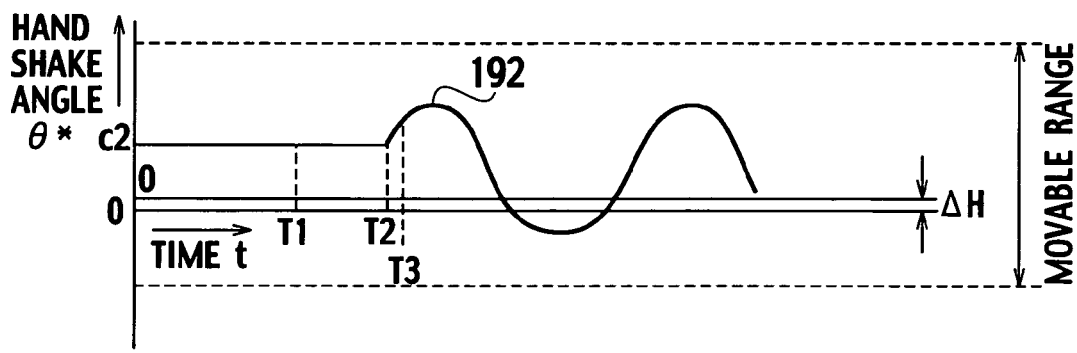

FIG. 22
(a)
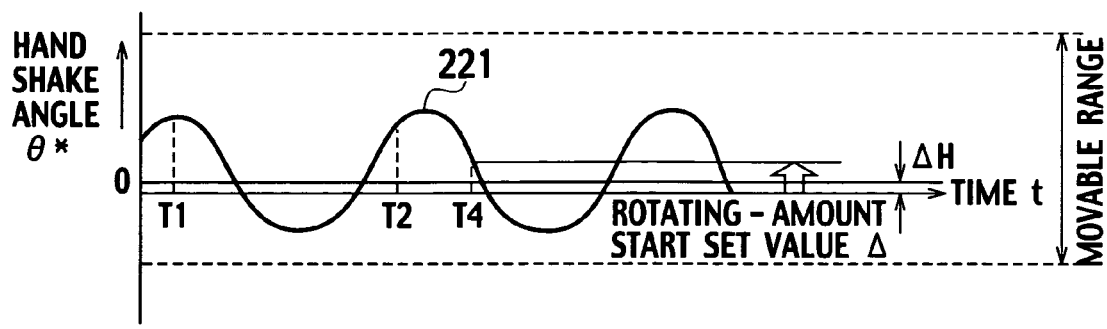
(b)
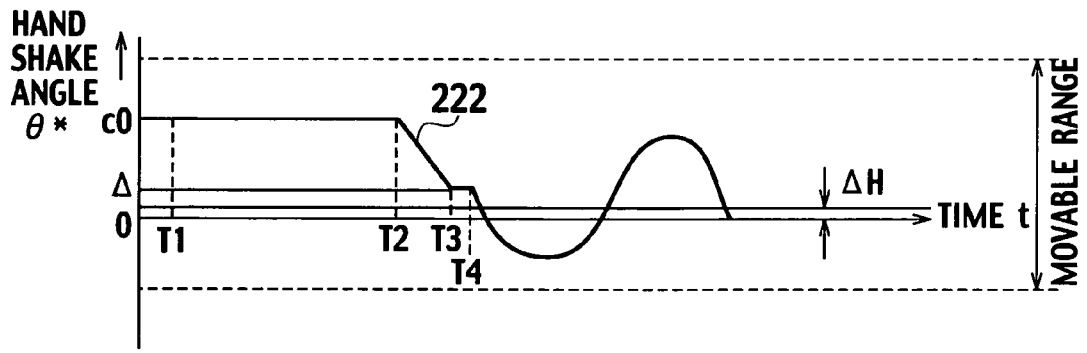

FIG. 24
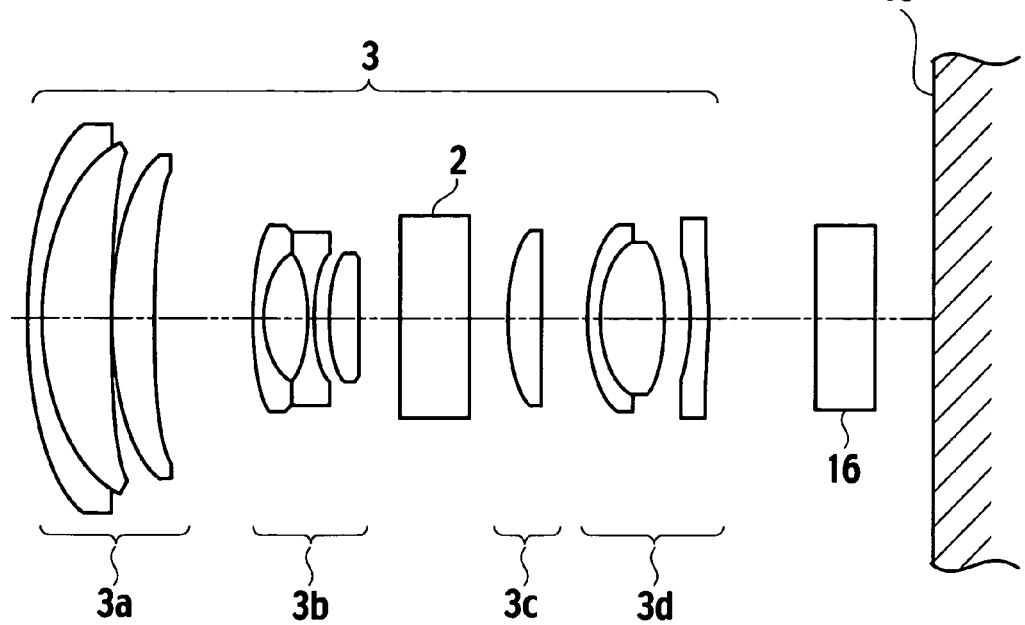
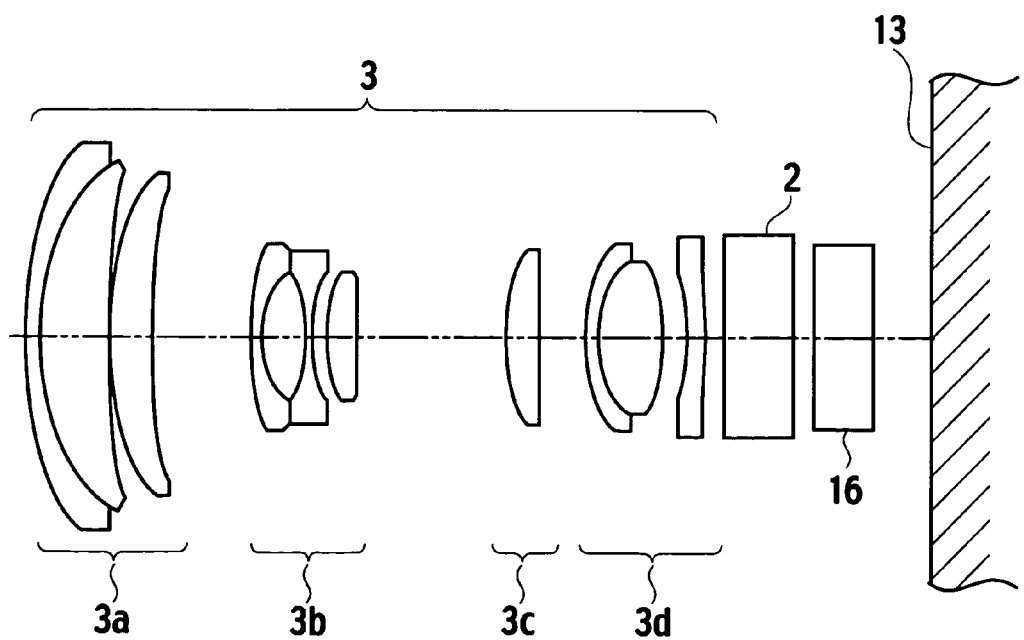

FIG. 26
(a)
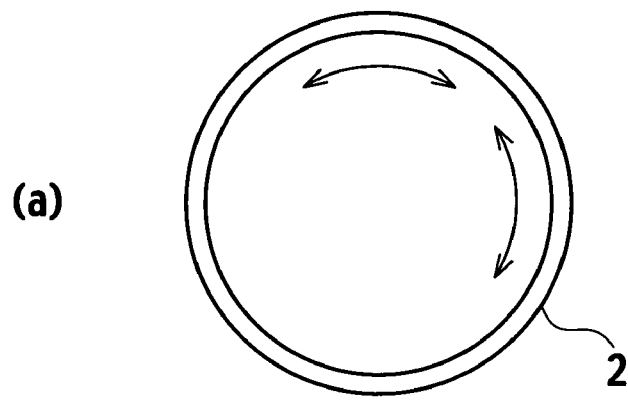
(b)
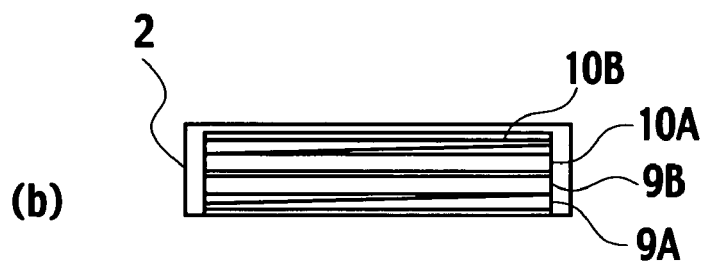
(c)
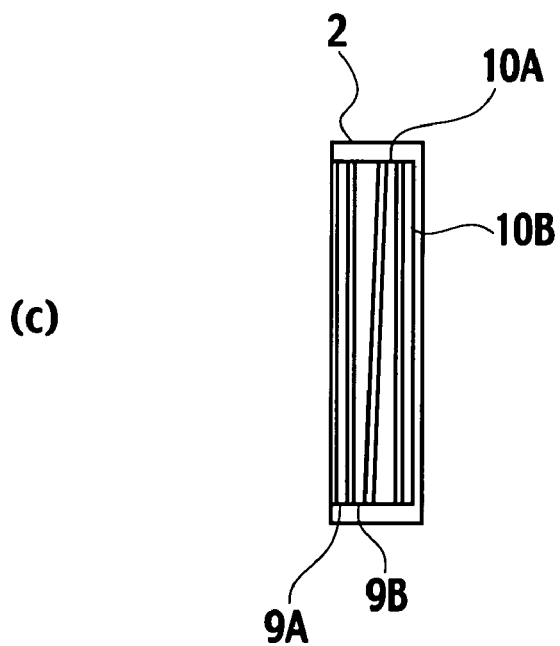

FIG. 27
(a)
(b)
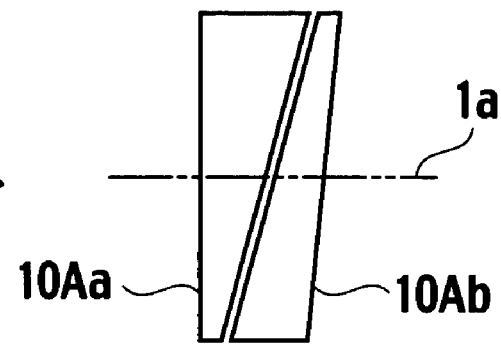
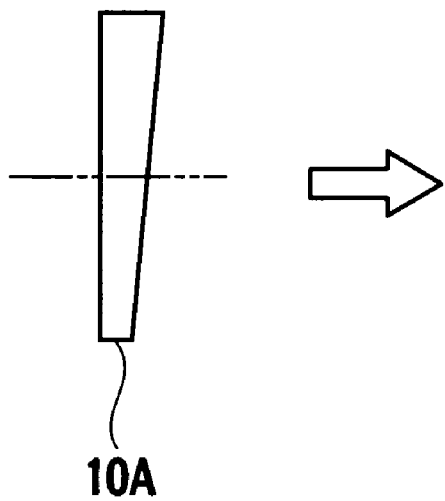
(c)
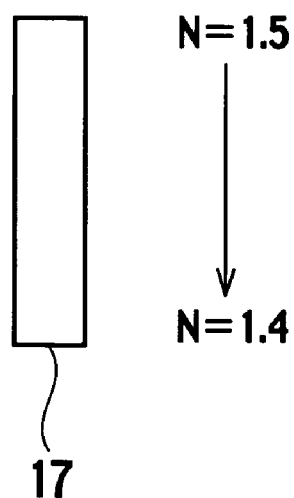

IMAGE FLUCTUATION CORRECTION DEVICE

TECHNICAL FIELD

The present invention relates to an image fluctuation correction device that controls a moving amount of a movable refraction element within its movable range appropriately when correcting the fluctuation of an image.

BACKGROUND OF ART

Patent Documents Nos. 1 to 3 (No. 1: Japanese Patent Publication Laid-open No. 03-094214, No. 2: Japanese Patent Publication Laid-open No. 04-352124, and No. 3: Japanese Patent Publication Laid-open No. 63-169614) have been proposed image fluctuation correction devices, each having a pair of movable refraction elements for changing the refracting direction of light incident on an optical lens, each of which detects a shake of an imaging equipment and rotates the pair of refraction elements vertically to an optical axis independently so as to cancel the detected shake, thereby to correct the fluctuation of an image.

According to these image fluctuation correction devices, it is possible to provide an image fluctuation correction device which is simple in its constitution and also easy to fabricate.

DISCLOSURE OF THE INVENTION

In common with these image fluctuation correction devices, however, when "positive-directional" rotating amounts of two movable refraction elements rotated in the positive direction toward the direction of an optical axis are equal to "negative directional" rotating amounts of two movable refraction elements rotated in the negative direction toward the direction of the optical axis, respective image shift angle vectors in both positive and negative directions determined by these rotating amounts become asymmetrical, in terms of their magnitude.

In detail, the magnitude of a "first-quadrant" image shift angle vector identical to the vector sum of image shift angle vectors of two movable refraction elements determined by the rotating amounts in the positive direction is different from the magnitude of a "third-quadrant" image shift angle vector identical to the vector sum of image shift angle vectors of two movable refraction elements determined by the rotating amounts in the negative direction.

Accordingly, if equalizing the movable ranges in both positive and negative directions, which represent the movable limits of two movable refraction elements, to each other, then the rotating amounts of the movable refraction elements are biased toward the upper limits in the movable ranges, so that it becomes difficult to control the rotating angles of the movable refraction elements so as not to exceed the movable ranges.

In consideration of the above-mentioned problem, an object of the present invention is to provide an image fluctuation correction device capable of controlling the moving amounts of the movable refraction elements within their movable ranges appropriately when correcting the fluctuation of an image.

According to a first aspect of the present invention, there is provided an image fluctuation correction device that corrects a fluctuation of an image caused by an on-camera shake of an imaging equipment having an optical lens, the image fluctuation correction device comprising: shake detecting means for detecting a horizontal or vertical shake generated in the imaging equipment thereby to output a shake signal based on the detected shake; a first movable refraction element arranged on an incident light path toward the optical lens to change a refracting direction of light being incident on the optical lens to a horizontal direction and a second movable refraction element arranged on the incident light path toward the optical lens to change the refracting direction of light being incident on the optical lens to a vertical direction; first rotating means for rotating the first movable refraction element within a predetermined movable range defining a clockwise direction and a counterclockwise direction toward the incident direction of light on the optical lens, as a positive direction and a negative direction, respectively; second rotating means for rotating the second movable refraction element within a predetermined movable range defining a counterclockwise direction and a clockwise direction toward the incident direction of light on the optical lens, as a positive direction and a negative direction, respectively; rotating control amount calculating means for calculating rotating control amounts of the first and second rotating means so as to cancel the horizontal or vertical shake detected by the shake detecting means; and rotating control means for controlling the first and second rotating means based on the rotating control amounts calculated by the rotating control amount calculating means, wherein the movable ranges are defined by rotating amounts each from a positive-directional maximum rotating amount, which represents a maximum rotating amount in the positive direction when a first-quadrant image shift angle defined by the rotating amounts of the first and second movable refraction elements rotated to the positive direction agrees with a third-quadrant image shift angle defined by the rotating amounts of the first and second movable refraction elements rotated to the negative direction, up to a maximum negative-directional rotating amount, which represents a maximum rotating amount in the negative direction when the first-quadrant image shift angle agrees with the third-quadrant image shift angle.

According to a second aspect of the present invention, there is provided an image fluctuation correction device that corrects a fluctuation of an image caused by an on-camera shake of an imaging equipment having an optical lens, the image fluctuation correction device comprising: shake detecting means for detecting a horizontal or vertical shake generated in the imaging equipment thereby to output a shake signal based on the detected shake; a first movable refraction element arranged on an incident light path toward the optical lens to change a refracting direction of light being incident on the optical lens to a horizontal direction and a second movable refraction element arranged on the incident light path toward the optical lens to change the refracting direction of light being incident on the optical lens to a vertical direction; first rotating means for rotating the first movable refraction element within a predetermined movable range defining a clockwise direction and a counterclockwise direction toward the incident direction of light on the optical lens, as a positive direction and a negative direction, respectively; second rotating means for rotating the second movable refraction element within a predetermined movable range defining a counterclockwise direction and a clockwise direction toward the incident direction of light on the optical lens, as a positive direction and a negative direction, respectively; rotating control amount calculating means for calculating rotating control amounts of the first and second rotating means so as to cancel the horizontal or vertical shake detected by the shake detecting means; and rotating control means for controlling the first and second rotating means based on the rotating control amounts calculated by the rotating control amount calculating means, wherein the movable ranges are defined by rotating amounts each from a positive-directional maximum rotating amount, which represents a maximum rotating amount in the positive direction when a difference between a first-quadrant image shift angle defined by the rotating amounts of the first and second movable refraction elements rotated to the positive direction and a third-quadrant image shift angle defined by the rotating amounts of the first and second movable refraction elements rotated to the negative direction falls within a predetermined range, up to a negative-direction maximum rotating amount, which represents a maximum rotating amount in the negative direction when the difference between the first-quadrant image shift angle and the third-quadrant image shift angle falls within the predetermined range.

BRIEF DESCRIPTION OF THE DRAWINGS

FIG. 2 includes schematic views showing a correction unit of the image fluctuation correction device shown in FIG. 1, in which FIG. 2(a) is a schematic front view and FIG. 2(b) is a schematic side view.

FIG. 3 includes structural views of the correction unit, in which FIG. 3(a) is a front view, FIG. 3(b) is a sectional view viewed in a direction B of FIG. 2(a), and FIG. 3(c) is a sectional view viewed in a direction A of FIG. 2(a).

FIG. 4 is a perspective view of a fixed prism that the correction unit of FIG. 3 includes.

FIG. 5 includes arrangement views of actuators and sensors that the correction unit of FIG. 3 includes, in which FIG. 5(a) is a schematic side view, FIG. 5(b) is an arrangement view of an actuator and a sensor of a movable prism 10A, and FIG. 5(c) is an arrangement view of an actuator and a sensor of a movable prism 10B.

FIG. 6 includes views explaining the movement of a subject image by a prism, in which FIG. 6(a) is a view explaining refraction of light by the prism and FIG. 6(b) is a view of the prism of FIG. 6(a) viewed in its front direction.

FIG. 7 is a view showing image shift vectors when movable prisms do not rotate.

FIG. 8 includes views explaining the movement of a subject image when the movable prisms rotate, in which FIG. 8(a) is a view showing the image shift vectors when the movable prisms rotate and FIG. 8(b) is a view where displacements of the image shift vectors of FIG. 8(a) are picked up.

FIG. 9 includes views showing parallel translating forms of a subject image (subject), in which FIG. 9(a) is a view of the subject image moved to a second quadrant, FIG. 9(b) is a view of the subject image moved to a first quadrant, FIG. 9(c) is a view of the subject image moved to a third quadrant, and FIG. 9(d) is a view of the subject image moved to a fourth quadrant.

FIG. 10(a) is a view explaining the magnitude of synthetic image shift angle vectors when equalizing the magnitude of the image shift angle vectors of the movable prisms to each other, and FIG. 10(b) is a view explaining the magnitude of image shift angle vectors of the movable prisms when equalizing the magnitude of synthetic image shift vectors to each other.

FIG. 11(a) is an explanatory view showing the synthetic image shift angle vector of the movable prisms and FIG. 11(b) is an explanatory view showing the image shift angle vector of the movable prism.

FIG. 12 includes views explaining an equivalent focal distance and a shift surface, in which FIG. 12(a) is a view explaining the equivalent focal distance and FIG. 12(b) is a view explaining a shift amount.

FIG. 13 includes views explaining a hand shake correction, in which FIG. 13(a) is a view explaining the movement of a subject image due to the hand shake and FIG. 13(b) is a view explaining the hand shake correction.

FIG. 17 includes views explaining a hand shake control start judgment process in case that the hand shake control starting means judges rotating angles "$\alpha_{10}$", "$\alpha_{20}$" are equal to rotating angles "$\alpha_1$", "$\alpha_2$", in which FIG. 17(a) is a view showing hand shake angle "$\theta^*$" with respect to a time t necessary for the movable prisms 10A, 10B to correct the fluctuation of an image and FIG. 17(b) is a view showing hand shake angle "$\theta^*$" since the hand shake correction control is started by the image fluctuation device in accordance with variation 2.

FIG. 18 includes views explaining the hand shake control start judgment process in case that the hand shake control starting means judges the absolute values of differences between the rotating angles "$\alpha_{10}$", "$\alpha_{20}$" and the rotating angles "$\alpha_1$", "$\alpha_2$" are minimum values, in which FIG. 18(a) is a view showing the hand shake angle "$\theta^*$" with respect to a time t necessary for the movable prisms 10A, 10B to correct the fluctuation of an image and FIG. 18(b) is a view showing the hand shake angle "$\theta^*$" since the hand shake correction control is started by the image fluctuation device in accordance with variation 2.

FIG. 19 includes views explaining the hand shake control start judgment process in case that the hand shake control starting means judges the absolute values of differences between the rotating angles "$\alpha_{10}$", "$\alpha_{20}$" and the rotating angles "$\alpha_1$", "$\alpha_2$" fall within a predetermined allowable range for rotating angles, in which FIG. 19(a) is a view showing the hand shake angle "$\theta^*$" with respect to a time t necessary for the movable prisms 10A, 10B to correct the fluctuation of an image and FIG. 19(b) is a view showing the hand shake angle "$\theta^*$" since the hand shake correction control is started by the image fluctuation device in accordance with this embodiment.

FIGS. 22(a) and 22(b) include views explaining the hand shake control start judgment process in the image fluctuation correction device in accordance with variation 4.

FIG. 24 includes views showing arrangement among the correction unit, the lens system and the others shown in FIG. 1, in which FIG. 24(a) is a view showing the correction unit arranged in the lens system and FIG. 24(b) is a view showing the correction unit arranged behind the lens system.

FIG. 25 includes views showing the correction unit without a fixed prism as another constitution of the correction unit of the embodiment, in which FIG. 25(a) is a front view of the correction unit, FIG. 25(b) is a plan view of the unit, and FIG. 25(c) is a side view of the unit.

FIG. 26 includes views showing the correction unit with two sheets of fixed prisms as the other constitution of the correction unit of the embodiment, in which FIG. 26(a) is a front view of the correction unit, FIG. 26(b) is a plan view of the unit, and FIG. 26(c) is a side view of the unit.

FIG. 27 includes views showing the other constitution of the prism of the embodiment, in which FIG. 27(a) is a view showing a simplex prism, FIG. 27(b) is a view of a compound prism, and FIG. 27(c) is a view showing a parallel plate having prism effect.

BEST MODE FOR CARRYING OUT THE INVENTION

An embodiment of the present invention will be described below, with reference to drawings. In this embodiment, we describe with illustration of an image fluctuation correction device that controls rotating amounts of movable prisms within predetermined movable ranges appropriately so that the rotating amounts of the movable prisms required to correct the fluctuation of an image do not exceed the movable ranges.

Figure 1:
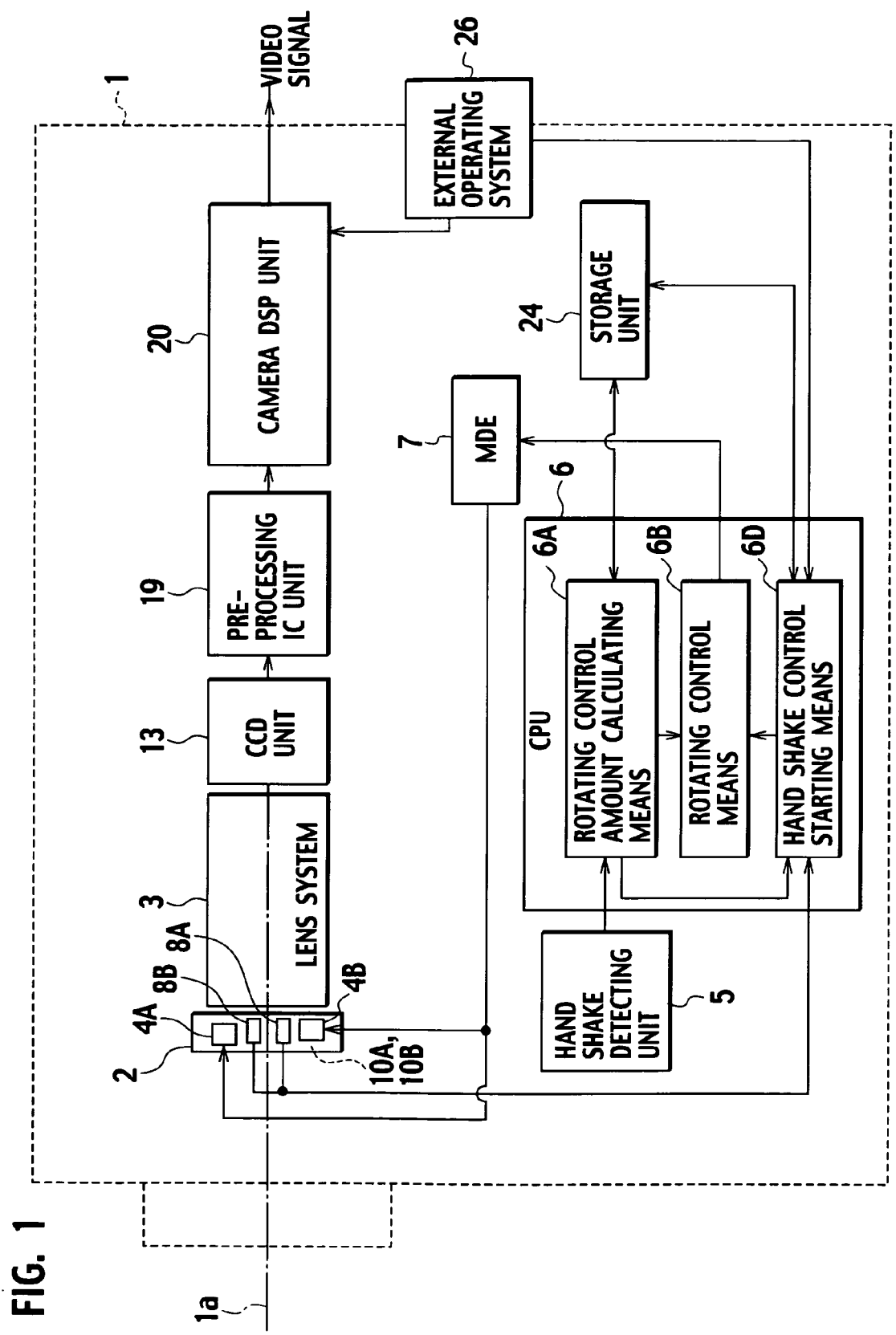
FIG. 1 is a block diagram showing the constitution of an image fluctuation correction device in accordance with an embodiment of the present invention.

FIG. 1 is a block diagram showing an image fluctuation correction device in accordance with one embodiment of the present invention. The image fluctuation correction device of the present invention is provided in a video camera 1 as an imaging device, for example.

In this embodiment, the video camera 1 includes a correction unit 2 having a fixed prism 9 and a pair of movable prisms 10A, 10B independently rotatable about an optical axis 1a as a rotating center, a lens system 3 for taking pictures of a subject, a CCD unit 13 allowing incident light through the lens system 3 to form an image and also converting a so-formed subject image into electrical signals, a pre-processing IC unit 19 having CDS, AGC and A/D conversion functions, a camera DSP unit 20 applying various digitization on input signals from the pre-processing IC unit 19, actuators 4A, 4B for rotating the pair of movable prisms in the correction unit 2 within predetermined movable ranges respectively and independently, a hand shake detecting unit 5 for detecting a shake by an angular speed of the video camera 1 due to hand shake etc. and generating hand shake signals, a CPU 6 carrying out various controls, a motor drive electronic circuit (MDE) 7 for driving the actuators 4A, 4B in response to the control signals from the CPU 6, sensors 8A, 8B for detecting rotations of the pair of movable prisms in the correction unit 2, a storage unit 24 for storing data etc. necessary for hand shake control and an external operating system 26 including operating buttons etc.

The CPU 6 includes rotating control amount calculating means 6A for calculating respective rotating control amounts of two actuators 4A, 4B so as to cancel the shake detected by the hand shake detecting unit 5, rotating control means 6B for controlling the actuators 4A, 4B based on the rotating control amounts calculated by the control amount calculating means 6A, and hand shake control starting means 6D for transmitting a hand shake control start signal for starting the control of the actuators 4A, 4B to the rotating control means 6B.

Figure 2:
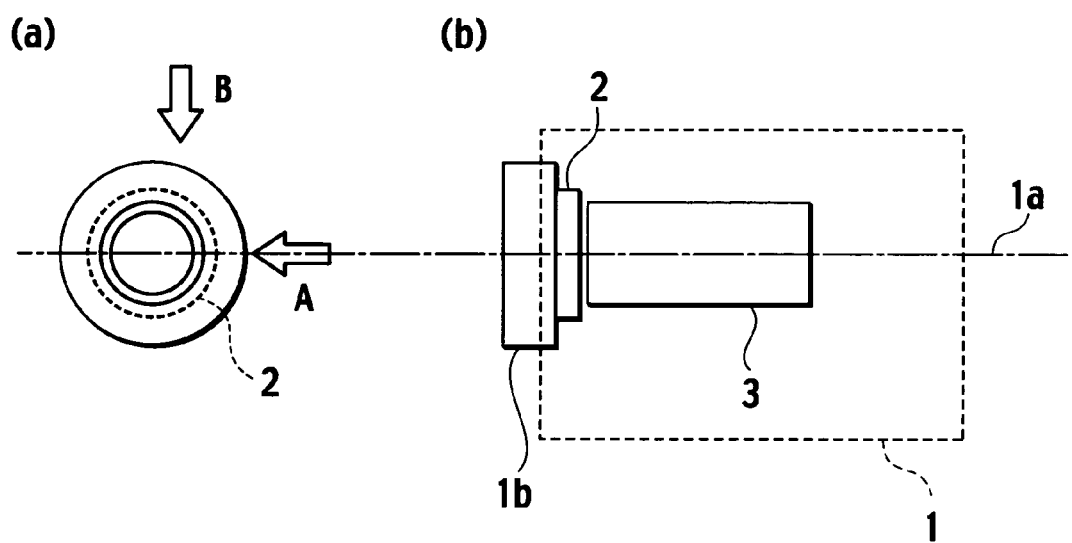

As shown in FIG. 2, the correction unit 2 is arranged between the lens system 3 and a hood part 1b covering a front face of the lens system 3. As shown in FIGS. 3(a) to 3(c), the correction unit 2 includes a fixed prism 9 immovable in position and a pair of movable prisms 10A, 10B rotatable about the optical axis as the rotating center.

As shown in FIG. 4, the fixed prism 9 includes a first face 9a perpendicular to the optical axis 1a and a second face 9b being a flat surface opposed to the first face 9a at a minute angle slant. The fixed prism 9 is made of acryl etc. The movable prisms 10A, 10B are also similar to the prism 9 in terms of shape and material.

Figure 5:
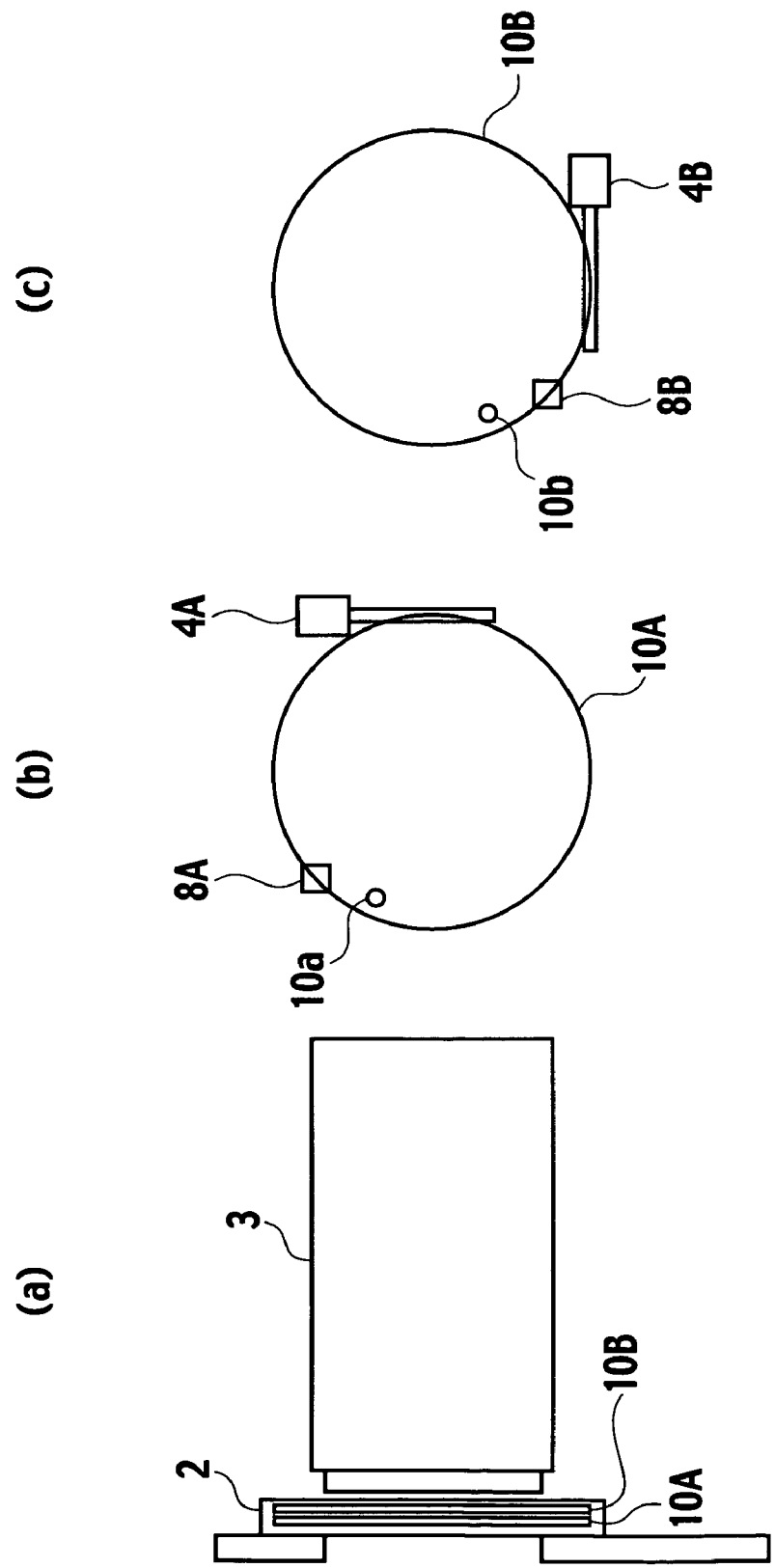

FIG. 5 includes arrangement views of actuators and sensors included in the correction unit 2 of FIG. 3. FIG. 5(a) is a schematic side view, FIG. 5(b) is an arrangement view of an actuator and a sensor of the movable prism 10A, and FIG. 5(c) is an arrangement view of an actuator and a sensor of the movable prism 10B. The actuators and the sensors are attached to the correction unit 2. As shown in FIGS. 5(b) and 5(c), the actuator 4A and the sensor 8A are provided for the movable prism 10A, while the actuator 4B and the sensor 8B are provided for the movable prism 10B.

The actuators 4A, 4B rotate the movable prisms 10A, 10B within predetermined movable ranges for the movable prisms 10A, 10B in response to the control signals from the rotating control means 6B of the CPU 6. The actuators 4A, 4B are formed by any ones of compact pulse motors, compact linear motors, compact ultrasonic motors, etc. all of which have small load torques in common.

The sensors 8A, 8B are formed by e.g. compact photo interrupters, MR elements, hall elements or the like. In operation, the sensors 8A, 8B detect the rotating conditions of the movable prisms 10A, 10B and further output the information about the rotating conditions to the CPU 6.

If adopting the compact photo interrupters for the sensors 8A, 8B, they would be used in combination with pulse motors. The movable prisms 10A, 10B are covered, on their circumferences, with masking materials on which holes 10a, 10b are formed respectively. The holes 10a, 10b are positioned in a manner that when the movable prisms 10A, 10B are brought into their initial positions, the holes 10a, 10b accord with the sensors 8A, 8B, respectively.

The compact photo interrupter includes an infrared-emitting diode and a photo transistor. The movable prism 10A or 10B are arranged between the infrared-emitting diode and the photo transistor.

When the device is powered ON, the movable prisms 10A, 10B are rotated. In this situation, the compact photo interrupters detect the prisms' respective original positions when the photo transistors receive lights of the infrared-emitting diodes passing through the holes 10a, 10b. Assuming that the numbers of pluses are together preset to zero at the prisms' original positions, the information about the rotating conditions of the prisms 10A, 10B could be obtained by counting the numbers of pulses during rotating of the prisms.

If adopting the sensors 8A, 8B formed by either MR elements or hall elements, magnetic bodies in place of the holes 10a, 10b are attached to the movable prisms 10A, 10B, respectively.

The MR elements or the hall elements detect changes in magnetic field caused by the magnetic bodies rotating together with the movable prisms 10A, 10B thereby to detect the information about the rotating conditions.

FIG. 6 includes views explaining the movement of a subject image by a prism. FIG. 6(a) is a view explaining refraction of light by the prism, while FIG. 6(b) is a view of the prism of FIG. 6(a) viewed in its front direction (arrow "a"). In FIG. 6(b), the prism 11 of FIG. 6(a) is rotated on a plane perpendicular to the direction a, by an angle "α". As shown in FIGS. 6(a) and 6(b), incident light is refracted by the prism 11 at a refraction angle "i". Consequently, the image of a subject "A" is shifted (in parallel translation), in the direction of a point "P", to a subject "A'".

In FIGS. 6(a) and 6(b), "i" denotes a prism angle (incident angle of light) of the prism 11, "L" a prism length, "δ" a prism height, "$δ_1$" a prism height at the thinnest part, "N" a refraction index, "i'" a refraction angle of light, "θ" an image shift angle (deflection angle), "α" a rotation angle of the prism, "$L_α$" a rotation amount of the prism, "$_{vector}e$" a unit vector in the direction of image shifting direction, and "$_{vector}θ$" an image shift angle vector. Assume here that the suffix "$_{vector}$" represents a vector quantity. In FIG. 6 and the following figures, these vector quantities are represented by bold faces in place of suffix "vector".

Here, the following relationship is established:

$$_{vector}θ = θ \cdot _{vector}e. \quad (1)$$

FIG. 6(a) shows, among the prism angle (incident angle) "i", the refraction angle "i'" and the image shift angle (deflection angle) "θ", there is established:

$$θ = i' - i. \quad (2)$$

In addition, Snell's law leads to $$\sin i' = N \sin i. \quad (3)$$

Assuming now that the prism angle "i" is small, then the equation (3) can be approximated as $$i' = Ni. \quad (4)$$

Therefore, substituting the equation (4) into the equation (2) gives $$θ = (N-1)i. \quad (5)$$

Further, FIGS. 6(a) and 6(b) show that, between the prism rotation length "$L_α$" and the prism rotation angle "α", there is established:

$$L_α = (L/2)α, \quad (6)$$

that is, $$α = (2/L)L_α. \quad (7)$$

Furthermore, the following relationship is established as well:

$$δ = L \tan i + δ_1, \quad (8)$$

that is, $$L = (δ - δ_1)/\tan i. \quad (9)$$

FIG. 7 is a view showing respective image shift angle vectors under condition that the movable prisms 10A, 10B do not rotate (in the initial state). In FIG. 7, "$_{vector}θ_1$", "$_{vector}θ_2$" and "$_{vector}θ_3$" denote image shift angle vectors by the fixed prism 9, the movable vectors 10A and 10B, respectively. As shown in FIG. 7, the positions of the fixed prism 9 and the movable prisms 10A, 10B are established so that "$_{vector}θ_1$" cancels a synthetic vector of "$_{vector}θ_2$" and "$_{vector}θ_3$". Consequently, as the fixed prism 9 and the movable prisms 10A, 10B in three sheets become equivalent to a parallel flat plate, the incident angle on the correction unit 2 becomes equal to an emitting angle, so that a subject image does not move.

FIG. 8 includes views explaining the movements of the subject image in case that the movable prisms 10A, 10B rotate. FIG. 8(a) is a view showing the image shift angle vectors when the movable prisms rotate, while FIG. 8(b) is a view showing displacements of the image shift angle vectors of FIG. 8(a).

Assume in FIG. 8(a), "$_{vector}θ_2'$" and "$_{vector}θ_3'$" represent image shift angle vectors when the movable prisms 10A, 10B rotate by angles "$α_1$" and "$α_2$", respectively. It is assumed here that rotating directions shown in FIG. 8(a) are respective positive directions of "$α_1$" and "$α_2$". That is, it is defined that the clockwise rotation of the movable prism 10A toward the incident direction of light on the lens system 3 accords with the positive direction, while the counterclockwise rotation of the prism 10A accords with the negative direction. In addition, it is defined that the counterclockwise rotation of the movable prism 10B toward the incident direction of light on the lens system 3 accords with the negative direction, while the clockwise rotation of the prism 10B accords with the positive direction.

Further, it is assumed that the following relationships are established.

$$_{vector}θ_a = _{vector}θ_2' - _{vector}θ_2, \quad (10)$$

$$_{vector}θ_b = _{vector}θ_3' - _{vector}θ_3. \quad (11)$$

Consequently, the image of the subject "A" is moved to point "A'" in translation, as shown in FIG. 8(b). Then, the image shift angle vector as a synthetic vector of "$_{vector}θ_a$" and "$_{vector}θ_b$" is described as $$_{vector}θ = _{vector}θ_a + _{vector}θ_b = (θ_X, θ_Y). \quad (12)$$

Then, FIGS. 8(a) and 8(b) show that the following relationships are established:

$$θ_X = θ_2 \sin α_1 - θ_3(1 - \cos α_2), \quad (13)$$

$$θ_Y = θ_3 \sin α_2 - θ_2(1 - \cos α_1), \quad (14)$$

where "$θ_2$" denotes a scalar of while "$θ_3$" denotes a scalar of

We here consider a vector having components "$α_1$" and "$α_2$", that is, $_{vector}α = (α_1, α_2)$. Resolving the equations (13) and (14) with respect to "$α_1$", "$α_2$" gives $$α_1 = ±\cos^{-1}(C/D) + α_1^*, \quad (15)$$

$$α_2 = ±\cos^{-1}\{[(θ_X + θ_3) - θ_2 \sin α_1]/θ_3\}, \quad (16)$$

wherein, $$C = [A^2 + B^2 + θ_2^2 - θ_3^2]/2θ_2, \quad (17)$$

$$D = (A^2 + B^2)^{1/2}, \quad (18)$$

$$α_1^* = ±\cos^{-1}(A/D), \text{(selecting sign of } B\text{)} \quad (19)$$

$$A = (θ_Y + θ_2), \text{ and} \quad (20)$$

$$B = (θ_X + θ_3). \quad (21)$$

Here, if the sign of "$α_1$" is minus (−), the sign of "$θ_Y$" is selected as the sign of "$α_2$". While, if the sign of "$α_1$" is plus (+), the sign of plus (+) is selected as the sign of "$α_2$".

Figure 9:
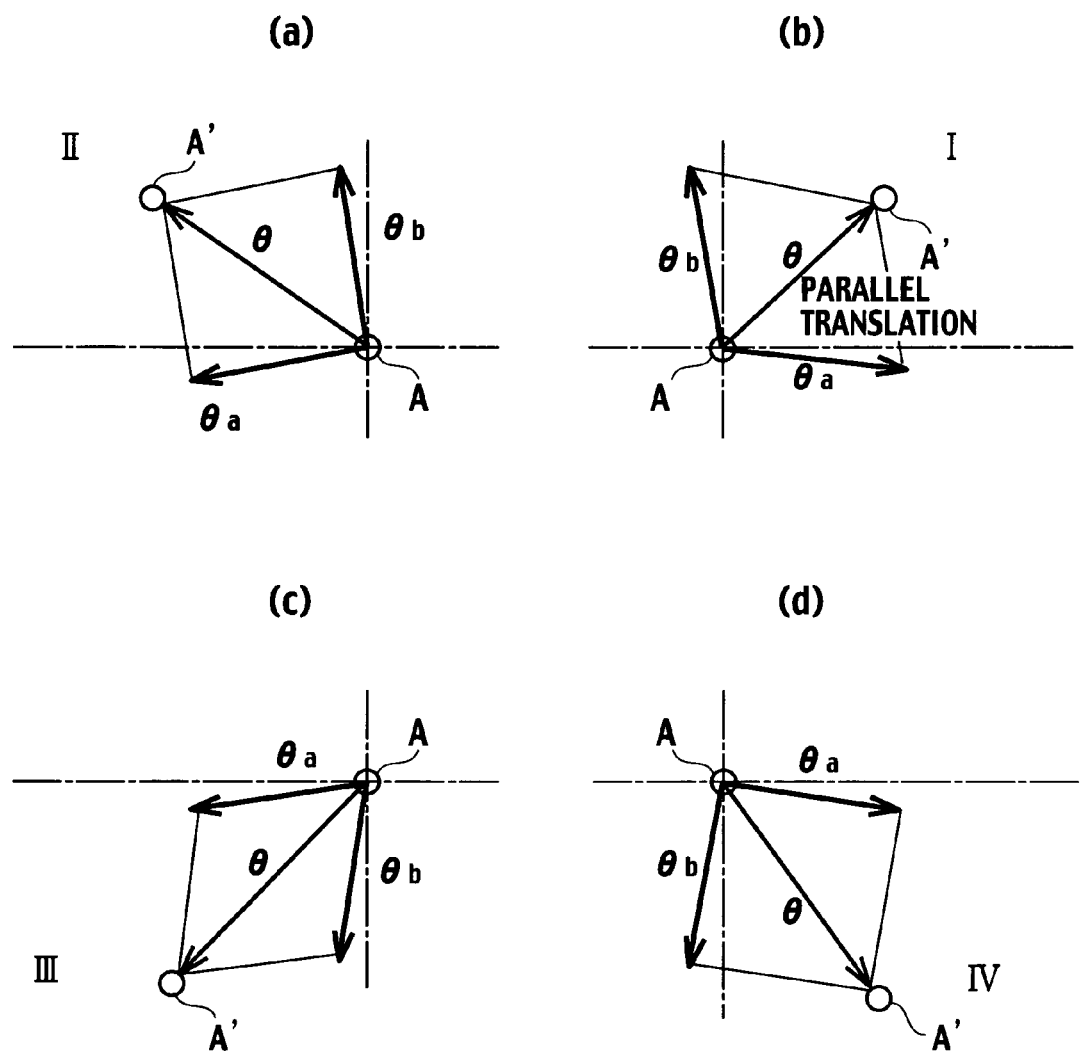

FIG. 9 includes views showing parallel translating forms of a subject image (subject). FIG. 9(a) is a view of the subject image moved to a second quadrant, FIG. 9(b) is a view of the subject image moved to a first quadrant, FIG. 9(c) is a view of the subject image moved to a third quadrant, and FIG. 9(d) is a view of the subject image moved to a fourth quadrant.

When the subject moves into the first quadrant, as shown in FIG. 9(b), the inequalities $α_1 > 0$ and $α_2 > 0$ are established because $θ_X > 0$ and $θ_Y > 0$. Further, when the subject moves into the second quadrant, as shown in FIG. 9(a), the inequalities $α_1 < 0$ and $α_2 > 0$ are established because $θ_X < 0$ and $θ_Y > 0$. Still further, when the subject moves into the third quadrant, as shown in FIG. 9(c), the inequalities $α_1 < 0$ and $α_2 < 0$ are established because $θ_X < 0$ and $θ_Y < 0$. Again, when the subject moves into the fourth quadrant, as shown in FIG. 9(d), the inequalities $α_1 > 0$ and $α_2 < 0$ are established because $θ_X > 0$ and $θ_Y < 0$.

Here, it is noted that the magnitude of the image shift angle vector $_{vector}\theta$ in the first quadrant of $\alpha_1 > 0$ and $\alpha_2 > 0$, which is shown in FIG. 9(b), is different from the magnitude of the image shift angle vector $_{vector}\theta$ in the third quadrant of $\alpha_1 < 0$ and $\alpha_2 < 0$, which is shown in FIG. 9(c).

This difference arises in that the directions of the image shift angle vectors $_{vector}\theta_a$ and $_{vector}\theta_b$ of the movable prisms 10A, 10B do not coincide with the directions of X, Y-coordinates as shown in FIGS. 9(a) to 9(d) in case of correcting the fluctuation of an image with the movable prisms (like the image fluctuation correction device of this embodiment), resulting in occurrence of misalignment in either the positive direction or the negative direction.

Accordingly, if equaling the movable ranges in both the positive direction and the negative direction of the movable prisms 10A, 10B to each other, then each of the rotating angles "$\alpha_1$", "$\alpha_2$" of the prisms 10A, 10B is biased toward the upper limit in the positive direction of the movable range.

That is why we are so previously establishing the movable ranges of the rotating angles "$\alpha_1$", "$\alpha_2$" of the prisms 10A, 10B in a manner that the shift angle vectors become unsymmetrical while the rotating angles "$\alpha_1$", "$\alpha_2$" of the prisms 10A, 10B do not exceed their movable ranges.

Suppose that, in detail, such a situation that the magnitude of a first-quadrant image shift angle vector determined by the rotating angles $\alpha_1, \alpha_2$ of the prisms 10A, 10B accords with the magnitude of another third-quadrant image shift angle vector determined by the rotating angles "$\alpha_1$", "$\alpha_2$" of the prisms 10A, 10B rotated to the negative direction. In this situation, on the premise of referring a maximum rotating angle in the positive direction and a maximum rotating angle in the negative direction to as "positive-directional maximum rotating angle" and "negative-directional maximum rotating angle" respectively, we now defines a rotating angle extending from the above positive-direction maximum rotating angle up to the above negative-directional maximum rotating angle as "movable range" with respect to each prism.

FIG. 10(a) is a view explaining the magnitude of synthetic image shift angle vectors when equalizing the magnitude of the image shift angle vectors of the movable prisms 10A, 10B to each other. While, FIG. 10(b) is a view explaining the magnitude of image shift angle vectors of the movable prisms 10A, 10B when equalizing the magnitude of synthetic image shift vectors to each other.

In FIG. 10(a), the magnitude of the first-quadrant image shift angle vector 105 with $\alpha_1 > 0$ and $\alpha_2 > 0$ differs from the magnitude of the third-quadrant image shift angle vector 106 with $\alpha_1 < 0$ and $\alpha_2 < 0$. That is, the image shift angle 105 obtained by rotating of the movable prisms 10A, 10B in the positive direction becomes smaller than the image shift angle 106 obtained by rotating of the movable prisms 10A, 10B in the negative direction. Thus, if synthetic image shift angle vectors having the same magnitude are desired in the first quadrant and the third quadrant, it is necessary to make the movable prisms 10A, 10B rotate larger in the positive direction. Accordingly, if the movable ranges of the movable prisms 10A, 10B in the positive direction are equal to those in the negative direction, the rotating angles "$\alpha_1$", "$\alpha_2$" of the prisms 10A, 10B are biased toward respective upper limits of the movable ranges in the positive direction.

On the other hand, FIG. 10(b) illustrates the movable ranges of the movable prisms 10A, 10B when the magnitude of the first-quadrant image shift angle vector 105 determined by the rotating angles "$\alpha_1$", "$\alpha_2$" of the movable prisms 10A, 10B accords with the magnitude of the third-quadrant image shift angle vector 106 determined by the rotating angles "$\alpha_1$", "$\alpha_2$" of the movable prisms 10A, 10B both rotated in the negative direction.

In this case, the shift angle vectors 101, 102 of the movable prisms 10A, 10B in the positive direction are different from the shift angle vectors 103, 104 of the movable prisms 10A, 10B in the negative direction, in terms of their magnitude. Consequently, as the movable ranges of the movable prisms 10A, 10B in the positive direction, which are required to be rotated greater, are broadened, it is possible to control the rotating angles "$\alpha_1$", "$\alpha_2$" of the movable prisms 10A, 10B appropriately so as not to exceed the movable ranges without a possibility that the rotating angles "$\alpha_1$", "$\alpha_2$" of the movable prisms 10A, 10B are biased toward the upper limits of the movable ranges in the positive direction.

FIG. 11(a) shows a synthetic image shift angle vector of the movable prisms 10A, 10B. FIG. 11(b) shows an image shift angle vector of the movable prism 10A.

Even when a synthetic image shift angle vector 110 of the movable prisms 10A, 10B forms a sinusoidal wave as shown in FIG. 11(a), the movable ranges of the movable prisms 10A, 10B are defined so that the magnitude of the first-quadrant image shift angle vector 105 determined by the rotating angles "$\alpha_1$", "$\alpha_2$" of the movable prisms 10A, 10B accords with the magnitude of the third-quadrant image shift angle vector 106 determined by the rotating angles $\alpha_1, \alpha_2$ of the movable prisms 10A, 10B both rotated in the negative direction. Thus, the movable range of the movable prism 10A is shifted to the positive direction, as shown in FIG. 11(b). Consequently, even when it is required to rotate a prism in the positive direction greater (like an image shift angle vector 111 of the movable prism 10A), it is possible to control the rotating angle "$\alpha_1$" of the movable prism 10A within the movable range appropriately.

Note that the movable ranges of the movable prisms 10A, 10B may be embodied by mechanical stoppers. Alternatively, the movable ranges may be embodied in the form of electrically-operated limiters.

FIG. 12 includes views explaining an equivalent focal distance and a shift amount FIG. 12(a) is a view explaining the equivalent focal distance, while FIG. 12(b) is a view explaining the shift amount.

In FIG. 12(a), "$S_F$" denotes a distance between the subject "A" and a first principal point of the lens system 3, and "f" denotes a focal length of the lens system 3. In this case, the equivalent focal distance "$f_m$" is identical to a distance between a second principal point of the lens system 3 and the CCD unit 13 for imaging a subject image 14A, and is represented by $$f_m = f + S_B \quad (22)$$

where $$S_B = f^2/S_F. \quad (23)$$

Next, as shown in FIG. 12(b), it is supposed that an insertion of the correction unit 2 causes the subject image 14A to be moved to a subject image 14A with an image shift angle θ. Then, a shift amount "S" is expressed by $$S = f_m \tan \theta. \quad (24)$$

FIG. 13 includes views explaining the hand shake correction. FIG. 13(a) is a view explaining the movement of a subject image caused by hand shake. FIG. 13(b) is a view explaining the hand shake correction.

As shown in FIG. 13(a), if the lens system 3 is rotated against a device's main body (e.g. video camera) upwardly, then the subject "A" is relatively rotated downwardly. As a result, the subject image 14A is shifted to the subject image 14A'. Here, "$_{vector}\theta*$" denotes a hand shake angle vector. If representing a shake angle by "$\theta*$" and a unit vector in the direction of hand shake by "$_{vector}e*(=-_{vector}e)$", then the hand shake angle vector is expressed as $$_{vector}\theta* = \theta* \cdot _{vector}e* \tag{25}$$

FIG. 13(b) shows a situation in which the correction unit 2 is inserted in front of the lens system 3. Then, if the image shift vector θ and the shake-angle vector θ* by the correction unit 2 satisfy with the following hand shake correcting condition:

$$_{vector}\theta = -_{vector}\theta*, \tag{26}$$

the subject image 14A' is moved to the position of the subject image 14A.

《Hand Shake Control》

Next, the hand shake correction control of the image fluctuation correction device of his embodiment will be described.

Figure 14:
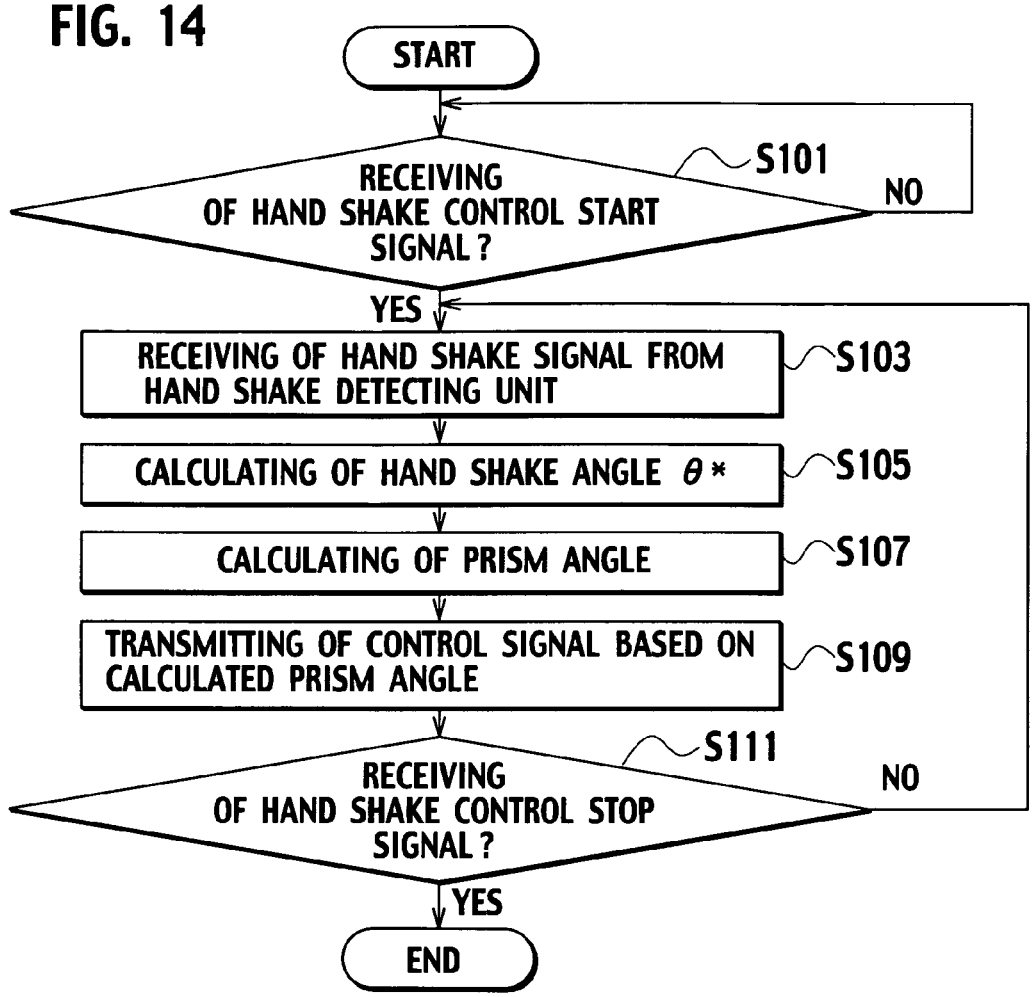
FIG. 14 is a flow chart showing the process flow of a hand shake control of the image fluctuation correction device in accordance with the embodiment.

FIG. 14 is a flow chart showing the process flow of the hand shake control of the image fluctuation correction device in accordance with this embodiment.

First of all, when receiving a command signal for starting the hand shake correction by a user's operating of push-buttons accepted by the external operating system 26, the control switching means 6D of the CPU 6 transmits the hand shake control start signal to the rotating control means 6B (step S101).

Then, the rotating control means 6B receiving the hand shake control start signal transmits a command of calculating a hand shake angle to the rotating control amount calculating means 6A. Then, receiving the command of calculating the hand shake angle, the rotating control amount calculating means 6A receives hand shake signals from the hand shake detecting unit 5 at predetermined intervals hand shake, and calculates the hand shake angle according to the received hand shake signal (steps S105 and S107).

In detail, the hand shake detecting unit 5 detects a shake of the video camera 1 caused by hand shake, and outputs the detected shake to the rotating control amount calculating means 6A of the CPU 6, in the form of a hand shake signal. Based on the hand shake signal, the rotating control amount calculating means 6A of the CPU 6 calculates a hand shake angle vector "θ*" representing both fluctuation's magnitude and direction by $$_{vector}\theta* = (\theta_X*, \theta_Y*). \tag{27}$$

Here, using the equation (26), the following equation gives $$(\theta_X, \theta_Y) = (-\theta_X*, -\theta_Y*). \tag{28}$$

Next, the rotating control amount calculating means 6A calculates the rotating angles "$\alpha_1$", "$\alpha_2$" of the movable prisms 10A, 10B, which are required for the hand shake correction based on the hand shake angle calculated at step S105, by the equations (15) to (21) (step S107).

Then, the rotating control means 6B of the CPU 6 receives the rotating angles "$\alpha_1$", "$\alpha_2$" calculated by the rotating control amount calculating means 6A, and outputs control signals to the motor drive electronic circuit 7 so that the rotating angles of the movable prisms 10A, 10B become "$\alpha_1$", "$\alpha_2$", respectively (step S109).

The motor drive electronic circuit 7 drives the actuators 4A, 4B in response to the control signals from the rotating control means 6B of the CPU 6. On the other hand, the actuators 4A, 4B rotates the movable prisms 10A, 10B within predetermined movable ranges so as to realize the rotating angles $\alpha_1$, $\alpha_2$, respectively.

Then, the rotating control means 6B of the CPU 6 repeats the processes of steps S103 to S109 until receiving the hand shake control stop signal from the control switching means 6D of the CPU 6 (step S111).

Thus, on the assumption of establishing the movable ranges of the movable prisms 10A, 10B each extending from the positive direction maximum rotating amount, which represents a maximum rotating amount in the positive direction at a time when the first-quadrant image shift angle determined by the rotating amounts of the movable prisms 10A, 10B rotated in the positive direction against the direction of the optical axis coincides with the third-quadrant image shift angle determined by the rotating amounts of the movable prisms 10A, 10B rotated in the negative direction, up to the negative direction maximum rotating amount representing a maximum rotating amount in the negative direction, the movable prisms 10A, 10B are rotated so as to cancel the shake detected by the hand shake detecting unit 5 thereby to correct the image fluctuation due to hand shake. Accordingly, it is possible to appropriately control the rotating amounts of the movable prisms 10A, 10B within the movable ranges so that the rotating amounts of the movable prisms 10A, 10B required to correct the fluctuation of an image do not exceed the movable ranges.

《Variations of Embodiment》

<Variation 1>

The image fluctuation correction device of the embodiment has the movable prisms 10A, 10B movable in the movable ranges identical to the rotating amounts each spreading from the positive-direction maximum rotating amount, which represents the maximum rotating amount in the positive direction at a time when the first-quadrant image shift angle determined by the rotating amounts of the movable prisms 10A, 10B rotated in the positive direction against the direction of the optical axis coincides with the third-quadrant image shift angle determined by the rotating amounts of the movable prisms 10A, 10B rotated in the negative direction, up to the negative-direction maximum rotating amount representing the maximum rotating amount in the negative direction.

While, according to variation 1, the movable ranges of the movable prisms 10A, 10B are defined by rotating amounts each spreading from the positive-directional maximum rotating amount, which represents the maximum rotating amount in the positive direction at a time when a difference between the first-quadrant image shift angle and the third-quadrant image shift angle falls within a predetermined range, up to the negative-directional maximum rotating amount representing the maximum rotating amount in the negative direction at the above time.

Figure 15:
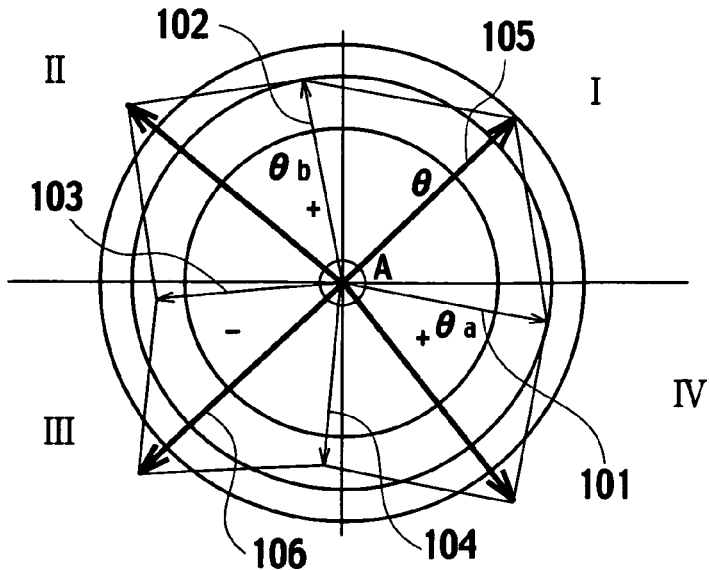
FIG. 15 is an explanatory view showing the magnitude of the image shift angle vectors of the movable prisms when a difference between the image shift angle vector in the first quadrant and the image shift angle vector in the third quadrant falls within a predetermined range.

FIG. 15 is an explanatory view showing the magnitude of the image shift angle vectors of the movable prisms 10A, 10B when a difference between the first-quadrant image shift angle vector and the third-quadrant image shift angle vector falls within the predetermined range.

In FIG. 15, the movable ranges of the movable prisms 10A, 10B are established so that a difference between the magnitude of a first-quadrant image shift angle vector 105 determined by the rotating angles "$\alpha_1$", "$\alpha_2$" of the movable prisms 10A, 10B and the magnitude of a third-quadrant image shift angle vector 106 determined by the rotating angles "$\alpha_1$", "$\alpha_2$" of the movable prisms 10A, 10B rotated in the negative direction falls within a predetermined range.

Therefore, the magnitude of the shift angle vectors 101, 102 of the movable prisms 10A, 10B in the positive direction differ from those of the shift angle vectors 103, 104 in the negative direction and additionally, the magnitude of the first-quadrant image shift angle vector 105 also differs from that of the third-quadrant image shift angle vector 106. Thus, it is possible to control the movable prisms 10A, 10B appropriately so that their rotating angles "$\alpha_1$", "$\alpha_2$" do not exceed the movable ranges while keeping a balance in magnitude between the image shift angle vectors of the movable prisms 10A, 10B and the respective synthetic image shift angle vectors.

<Variation 2>

We hereinabove describe the image fluctuation correction device which appropriately controls the rotating amounts of the movable prisms within the predetermined movable ranges so that the rotating amounts of the movable prisms required for correcting the fluctuation of an image do not exceed the movable ranges, as an example of embodiments of the present invention.

In Variation 2, we herein describe an image fluctuation correction device which appropriately controls the rotating amounts of the movable prisms within the predetermined movable ranges by adjusting the timing of starting the hand shake correction control.

In detail, we describe the image fluctuation correction device that receives the information about the rotating angles of the movable prisms 10A, 10B through the sensors 8A, 8B, further calculates the rotating angles required for the movable prisms 10A, 10B to correct a hand shake on the ground of a shake detected by the hand shake detection unit 5, further compares the calculated rotating angles with the rotating angles calculated based on the received information about the rotating angles, and transmits a hand shake control start signal for starting the control of the actuators 4A, 4B to the rotating control means 6B either when the calculated rotating angles accord with the rotating angles based on the received information or when the absolute values of differences between the former rotating angles and the latter rotating angles become minimized.

In addition to the constituents of the image fluctuation correction device of FIG. 1, the image fluctuation correction device of Variation 2 is characterized in that, after receiving the command signal of starting the hand shake correction by the outside operation, the hand shake control starting means 6D of the CPU 6 transmits the hand shake control starting signal for starting the control of the actuators 4A, 4B to the rotating control means 6B when the rotating angles "$\alpha_{10}$", "$\alpha_{20}$" detected by the sensors 8A, 8B accord with the rotating angles "$\alpha_1$", "$\alpha_2$" calculated by the rotating control amount calculating means 6A or when the absolute values of differences between the rotating angles "$\alpha_0$", "$\alpha_2$" and the rotating angles "$\alpha_1$", "$\alpha_2$" become minimized.

Figure 16:
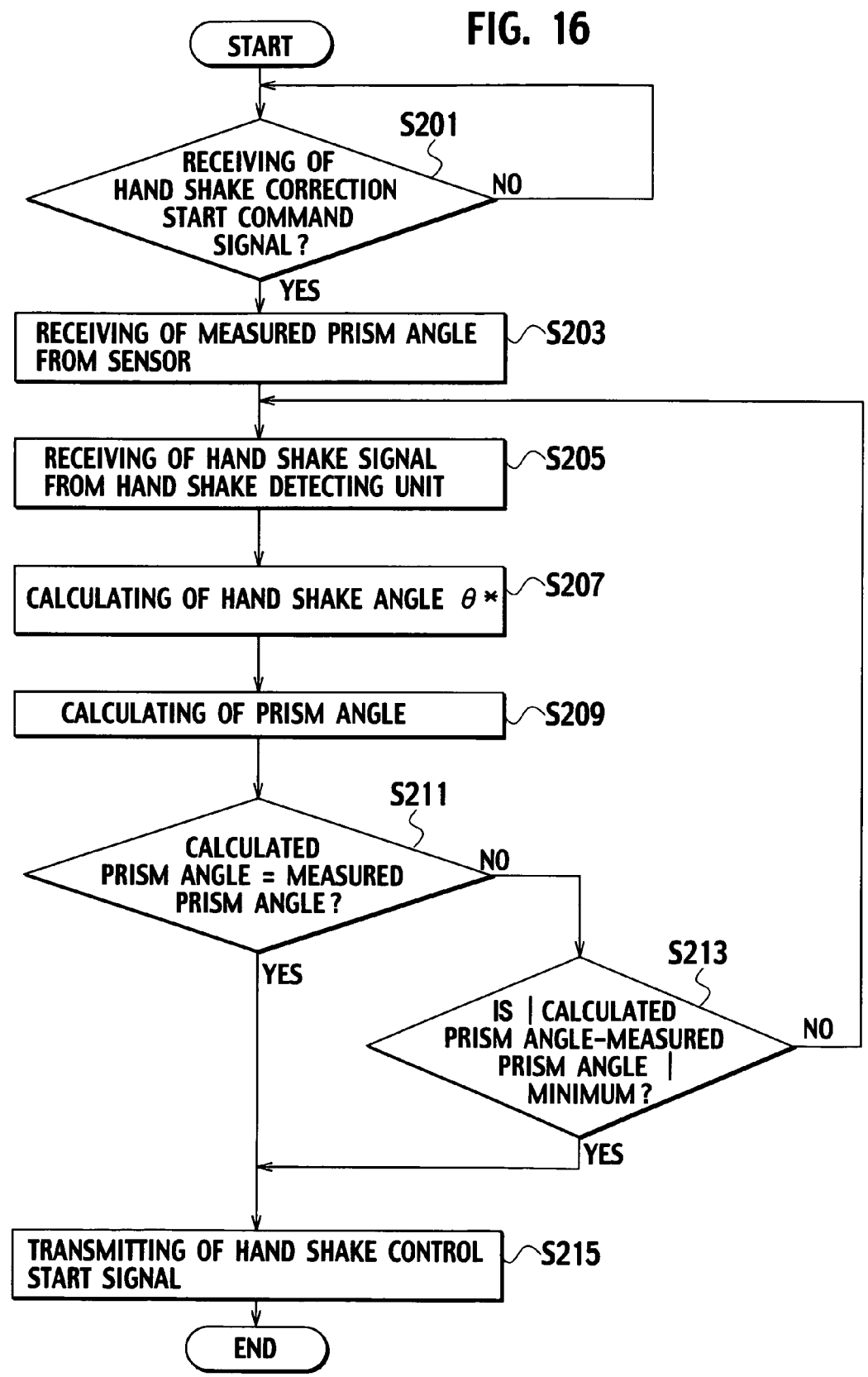
FIG. 16 is a flow chart showing the process flow of the image fluctuation correction device in accordance with variation 2 of this embodiment.

FIG. 16 is a flow chart showing the process flow of the image fluctuation correction device in accordance with Variation 2.

First of all, when receiving a command signal of starting the hand shake correction by a user's manipulating of push-buttons accepted by the external operating system 26 (step S201), the hand shake control starting means 6D of the CPU 6 calculates rotating angles "$\alpha_{10}$", "$\alpha_{20}$" of the movable prisms 10A, 10B upon receipt of their rotating information detected by the sensors 8A, 8B (step S203).

Then, the hand shake control starting means 6D of the CPU 6 transmits a command of calculating a hand shake angle to the rotating control amount-calculating means 6A. Then, receiving the command of calculating the hand shake angle vector "v=", the rotating control amount calculating means 6A further receives hand shake signals from the hand shake detecting unit 5, and calculates the hand shake angle vector "$_{vector}\theta^*$" according to the received hand shake signal (steps S205, S207).

Next, based on the hand shake angle vector $\theta^*$ calculated at step S207, the rotating control amount calculating means 6A calculates the rotating angles "$\alpha_1$", "$\alpha_2$" of the movable prisms 10A, 10B required to correct the hand shake (step S209).

In detail, the hand shake detecting unit 5 detects a camera shake of the video camera 1 due to hand shake, and outputs the detected shake in the form of hand shake signals to the rotating control amount calculating means 6A of the CPU 6. Based on the hand shake signals, the rotating control amount calculating means 6A of the CPU 6 calculates a hand shake angle vector "$_{vector}\theta^*$" representing both shake's magnitude and direction by the calculating equations (27), (28).

Then, the rotating control amount calculating means 6A of the CPU 6 calculates the components "$\alpha_1$", "$\alpha_2$" of the rotating angle vector "$_{vector}\alpha$", based on the equations (15) to (21).

《Hand Shake Control Start Judgment Process》

Next, the hand shake control starting means 6D of the CPU 6 judges whether the hand shake correction control should be started or not (steps S211 to S215).

In detail, the hand shake control starting means 6D of the CPU 6 compares the rotating angles "$\alpha_{10}$", "$\alpha_{20}$" calculated based on the rotating information of the movable prisms 10A, 10B detected by the sensors 8A, 8B with the rotating angles "$\alpha_1$", "$\alpha_2$" of the movable prisms 10A, 10B calculated by the rotating control amount calculating means 6A of the CPU 6.

Thus, when the rotating angles "$\alpha_{10}$", "$\alpha_{20}$" and the rotating angles "$\alpha_1$", "$\alpha_2$" are equal to each other (step S211) or when the absolute values of differences between the rotating angles "$\alpha_{10}$", "$\alpha_{20}$" and the rotating angles "$\alpha_1$", "$\alpha_2$" become minimized, the hand shake control starting means 6D of the CPU 6 transmits the hand shake control start signal for starting the control of the actuators 4A, 4B to the rotating control means 6B of the CPU 6.

FIG. 17 includes views explaining the hand shake control start judgment process in case that the hand shake control staring means 6D of the CPU 6 judges that the rotating angles "$\alpha_{10}$", "$\alpha_{20}$" and the rotating angles "$\alpha_1$", "$\alpha_2$" are equal to each other. FIG. 17(a) shows the hand shake angle "$\theta^*$" with respect to a time "t", which is required for the movable prisms 10A, 10B to correct the fluctuation of an image. FIG. 17(b) shows the hand shake angle "$\theta^*$" under condition that the hand shake correction control is started by the image fluctuation correction device in accordance with Variation 2.

In the image fluctuation correction device of Variation 2, as the movable prisms 10A, 10B are movable independently of each other in the vertical and horizontal directions, the hand shake angles "$\theta^*$" in the vertical and horizontal directions are calculated independently of each other, for the hand shake start judgment process. For the sake of shorthand, however, FIG. 17 only illustrates the hand shake angle "$\theta^*$" in the vertical direction to be corrected by the movable prism 10A.

In FIG. 17(a), a hand shake angle curve 171 represents the hand shake angle "$\theta^*$" with respect to a time "t", which is required for the movable prism 10A to correct the fluctuation of an image. Due to the above-mentioned asymmetry property in the synthetic image shift angle vectors, the oscillation center of the hand shake angle curve 171 is shifted to the positive (+) side from a correction-zero position of the hand shake angle, by $\Delta H$.

At a time "T1", when receiving the hand shake correction start command signal due to an outside operation by a user etc., the CPU 6 starts the hand shake control start judgment process.

First of all, at the time "T1", the hand shake control starting means 6D of the CPU 6 receives the rotating information about the movable prism 10A detected by the sensor 8A, and obtains the value of the rotating angle "$\alpha_{10}$" corresponding to "c0". Note that "c0" denotes an initial position of the movable prism 10A at the time of receiving the hand shake correction start command signal through an outside operation by a user etc.

Therefore, the hand shake control starting means 6D of the CPU 6 transmits a command of calculating the hand shake angle to the rotating control amount calculating means 6A. At the time T1 and thereafter, the rotating control amount calculating means 6A receives the hand shake signals from the hand shake detecting unit 5, and calculates the hand shake angle "θ*" based on the received hand shake angle.

In addition, at the time "T1" and thereafter, the rotating control amount calculating means 6A calculates the rotating angle "$\alpha_1$" of the prism 10A required to correct the hand shake, based on the calculated hand shake angle "θ*", by the equations (15) to (21).

Next, the hand shake control starting means 6D of the CPU 6 compares the rotating angle "$\alpha_{10}$", which is calculated based on the rotating information of the movable prism 10A detected by the sensor 8A, with the rotating angle "$\alpha_1$" of the prism 10A calculated by the rotating control amount calculating means 6A of the CPU 6.

In FIG. 17(a), as the hand shake angles "θ*" corresponding to the rotating angle "$\alpha_{10}$" and the rotating angle "$\alpha_1$" become "c0" at a time "T2" together, the hand shake control starting means 6D of the CPU 6 transmits the hand shake control start signal for starting the control of the actuators 4A, 4B to the rotating control means 6B of the CPU 6.

Thus, on receipt of the hand shake control start signal from the hand shake control starting means 6D, the rotating control means 6B of the CPU 6 starts the hand shake correction control.

Consequently, as shown with a hand shake correcting curve 172 of FIG. 17(b), the rotating control means 6B of the CPU 6 starts the hand shake correction control from a time "T2". In addition, as mentioned above, as the movable ranges of the rotating angles "$\alpha_1$", "$\alpha_2$" of the movable prisms 10A, 10B are established so that the shift angle vectors of the movable prisms 10A, 10B have asymmetrical magnitudes, the movable ranges of the rotating angles "$\alpha_1$", "$\alpha_2$" of the movable prisms 10A, 10B are shifted to the positive (+) side by ΔH. Consequently, the oscillation center of the hand shake correcting curve 172 coincides with a center of the predetermined movable range of the movable prism 10A, allowing the rotating amount of the movable prism 10A to be appropriately controlled within the movable range so that the hand shake correcting curve 172 does not exceed the movable range.

FIG. 18 includes views explaining the hand shake control start judgment process in case that the hand shake control starting means 6D of the CPU 6 judges that the absolute values of differences between the rotating angles "$\alpha_{10}$", "$\alpha_{20}$" and the rotating angles "$\alpha_1$", "$\alpha_2$" are minimum values. In FIG. 18(a), a hand shake curve 181 represents a hand shake angle "θ*" with respect to a time "t", which is required for the movable prisms 10A, 10B to correct the fluctuation of an image. Due to the above-mentioned asymmetry property in the synthetic image shift angle vectors, the oscillation center of the hand shake angle curve 181 is shifted to the positive (+) side from a correction-zero position of the hand shake angle, by ΔH. FIG. 18(b) shows the hand shake angle "θ*" under condition that the hand shake correction control is started by the image fluctuation correction device of Variation 2.

Note that, as similar to FIG. 17, FIG. 18 illustrates the hand shake angle curve in the vertical direction in charge of the movable prism 10A for the sake of shorthand.

First, when the hand shake control starting means 6D of the CPU 6 receives the hand shake correction start command signal by an outside operation at the time "T1", the CPU 6 starts the hand shake control start judgment process.

Then, at the time "T1", the hand shake control starting means 6D of the CPU 6 receives the rotating information about the movable prism 10A detected by the sensor 8A, and obtains the value of the rotating angle "$\alpha_{10}$" corresponding to "c1".

Then, the hand shake control starting means 6D of the CPU 6 transmits a command of calculating the hand shake angle to the rotating control amount calculating means 6A. At the time "T1" and thereafter, the rotating control amount calculating means 6A receives the hand shake signals from the hand shake detecting unit 5, and calculates the hand shake angle "θ*" based on the received hand shake angle.

In addition, at the time T1 and thereafter, the rotating control amount calculating means 6A calculates the rotating angle "$\alpha_1$" of the prism 10A required to correct the hand shake, based on the calculated hand shake angle "θ*", by the equations (15) to (21).

Next, the hand shake control starting means 6D of the CPU 6 compares the rotating angle "$\alpha_{10}$", which is calculated based on the rotating information of the movable prism 10A detected by the sensor 8A, with the rotating angle "$\alpha_1$" of the prism 10A calculated by the rotating control amount calculating means 6A of the CPU 6.

Further, the rotating control amount calculating means 6A of the CPU 6 calculates the absolute value of a difference between the rotating angle "$\alpha_{10}$" and the rotating angle "$\alpha_1$", as a phase difference in the rotating angles. Further, the rotating control amount calculating means 6A stores the calculated phase difference in the rotating angles in the storage unit 24.

Next, the hand shake control starting means 6D of the CPU 6 reads the stored phase difference in the rotating angles out of the storage unit 24. If the difference between the readout phase difference in the rotating angles and a newly calculated phase difference in the rotating angles becomes minimized, in other words, when the absolute value of a rotating angle of the movable prism 10A calculated by the rotating control amount calculating means 6A is less than the absolute value of the rotating angle "$\alpha_{10}$" corresponding to "c1", and when the absolute value of a difference between the rotating angle "$\alpha_1$" of the movable prism 10A calculated by the rotating control amount calculating means 6A and the rotating angle "$\alpha_{10}$" corresponding to "c1" becomes minimized, the hand shake control starting means 6D judges that the absolute value of a value of the hand shake angle "θ*" has become minimized, and transmits a control start signal for starting the control of the two actuators 4A to the rotating control means 6B of the CPU 6.

In FIG. 18, at the time "T2", the absolute value of the hand shake angle "θ*" becomes minimized, that is, the absolute value of a difference between the rotating angle "$\alpha_1$" of the movable prism 10A and the rotating angle "$\alpha_{10}$" corresponding to "c1" becomes minimized. Therefore, when a time has passed the time "T2", the hand shake control starting means 6D of the CPU 6 transmits the control start signal for starting the control of the two actuators 4A to the rotating control means 6B of the CPU 6.

Then, the rotating control means 6B of the CPU 6 starts the hand shake correction control when receiving the control start signal from the hand shake control starting means 6D.

Consequently, as shown with a hand shake correcting curve 182 of FIG. 18(b), as the rotating control means 6B of the CPU 6 starts the hand shake correction control from the time "T2", the oscillation center of the hand shake correcting curve 182 is shifted toward the center of the movable range of the movable prism 10A in comparison with the situation of starting the hand shake correction control from the time "T1". Further, as mentioned above, as the movable ranges of the rotating angles "$\alpha_1$", "$\alpha_2$" of the movable prisms 10A, 10B are established so that the shift angle vectors of the movable prisms 10A, 10B have asymmetrical magnitudes, the movable ranges of the rotating angles "$\alpha_0$", "$\alpha_2$" of the movable prisms 10A, 10B are shifted to the positive (+) side by $\Delta H$. Therefore, it is possible to control the rotating amount of the movable prism 10A within the movable range appropriately so that the hand shake correcting curve 182 does not exceed the movable range.

As mentioned above, after receiving the hand shake correction start command signal through an outside operation and either when the rotating amounts detected by the sensors 8A, 8B agree with the rotating control amounts calculated by the rotating control amount calculating means 6A or when the absolute values of differences between the rotating amounts and the rotating control amounts become minimized, it is performed to transit the control start signal for starting the control of the two actuators 4A, 4B to the rotating control means 6B. Therefore, it is possible to control the movable amounts of the movable prisms 10A, 10B within the movable ranges so that the correction amounts do not exceed the movable ranges, appropriately.

In the image fluctuation correction device of Variation 2, the transmission of the control start signal to the rotating control means 6B is based on the comparison of the rotating angle "$\alpha_{10}$" with the rotating angle "$\alpha_1$". Alternatively, on the premise of calculating a hand shake angle from the rotating amounts detect by the sensors 8A, 8B, the hand shake control stating means 6D may transmit the control start signal to the rotating control means 6B in accordance with the result of comparing the above hand shake angle with a hand shake angle based on the hand shake signal from the hand shake detecting unit 5, which is calculated by the rotating control amount calculating means 6A.

<Variation 3>

In Variation 2, the image fluctuation correction device is constructed so as to transmit the hand shake control start signal for starting the control of two actuators 4A, 4B to the rotating control means 6B either when the rotating amounts detected by the sensors 8A, 8B agree with the rotating control amounts calculated by the rotating control amount calculating means 6A or when the absolute values of differences between the rotating amounts and the rotating control amounts become minimized. On the contrary, according to Variation 3, the image fluctuation correction device is constructed so as to transmit the hand shake control start signal for starting the control of two actuators 4A, 4B to the rotating control means 6B when the absolute values of differences between the rotating amounts detected by the sensors 8A, 8B and the rotating control amounts calculated by the rotating control amount calculating means 6A fall within a predetermined rotating-angle allowable range or when the absolute values of differences between the rotating amounts and the rotating control amounts become minimized.

FIG. 19 includes views explaining the hand shake control start judgment process in case that the hand shake control starting means 6D of the CPU 6 judges that the absolute values of differences between the rotating angles "$\alpha_{10}$", "$\alpha_{20}$" and the rotating angles "$\alpha_1$", "$\alpha_2$" fall within the predetermined allowable range. FIG. 19(a) shows the hand shake angle "*" with respect to a time t, which is required for the movable prisms 10A, 10B to correct the fluctuation of an image. FIG. 19(b) shows the hand shake angle "$\theta$*" under condition that the hand shake correction control is stared by the image fluctuation correction device of this embodiment.

Note that, as similar to FIG. 17, FIG. 19 illustrates the hand shake angle "$\theta$*" in the vertical direction to be corrected by the movable prism 10A, for the sake of shorthand.

In FIG. 19(a), a hand shake angle curve 191 represents the hand shake angle "$\theta$*" with respect to a time "t", which is required for the movable prism 10A to correct the fluctuation of an image. Due to the above-mentioned asymmetry property in the synthetic image shift angle vectors, the oscillation center of the hand shake angle curve 191 is shifted to the positive (+) side from a correction-zero position of the hand shake angle, by $\Delta H$.

If receiving the hand shake correction start command signal due to an outside operation by a user etc. at the time "T1", then the CPU 6 starts the hand shake control start judgment process.

First, at the time "T1", the hand shake control starting means 6D of the CPU 6 receives the rotating information about the movable prism 10A detected by the sensor 8A, and obtains the value of the rotating angle "$\alpha_{10}$" corresponding to "c2".

Then, the hand shake control starting means 6D of the CPU 6 transmits a command of calculating the hand shake angle to the rotating control amount calculating means 6A. At the time "T1" and thereafter, the rotating control amount calculating means 6A receives the hand shake signals from the hand shake detecting unit 5, and calculates the hand shake angle "$\theta$*" based on the received hand shake angle, by the equations (15) to (21).

In addition, at the time "T1" and thereafter, the rotating control amount calculating means 6A calculates the rotating angle "$\alpha_1$" of the prism 10A required to correct the hand shake, based on the calculated hand shake angle "$\theta$*".

Next, the hand shake control starting means 6D of the CPU 6 compares the absolute value of a difference between the calculated rotating angle "$\alpha_{10}$" based on the rotating information of the movable prism 10A detected by the sensor 8A and the rotating angle "$\alpha_1$" of the prism 10A calculated by the rotating control amount calculating means 6A of the CPU 6 with a rotating-angle allowable range "K" read out of the storage unit 24.

As the absolute value of the difference between the rotating angle "$\alpha_{10}$" and the rotating angle "$\alpha_1$" becomes less than the rotating-angle allowable range "K" at the time "T2", the hand shake control starting means 6D of the CPU 6 transmits the control start signal for starting the control of the actuators 4A, 4B to the rotating control means 6B of the CPU 6.

The value of the rotating-angle allowable range "K" constitutes a condition to start the hand shake correction control. Thus, the rotating-angle allowable range "K" is determined depending on how much deviations of the movable ranges of the movable prisms 10A, 10B from the hand shake correction range should be permitted. The larger this value of the rotating-angle allowable range "K" gets, the earlier the hand shake correction control is started since the acceptance of the hand shake correction start command signal through a user's manipulating of push buttons etc. Conversely, the smaller the value of the allowable range "K" gets, the smaller respective distances between the oscillation centers of the hand shake correction amounts required for the movable prisms 10A, 10B to correct the fluctuation of an image and the centers of the movable ranges of the prisms 10A, 10B do become. In such a case, it becomes difficult for the hand shake correction amounts to exceed the movable ranges of the movable prisms 10A, 10B.

Note that this rotating-angle allowable range "K" is previously established by an image fluctuation correction device's provider or the like, and is stored in the storage unit 24.

Consequently, as shown with a hand shake correction curve 192 of FIG. 19(b), as the hand shake correction control is started from the time "T2", it is possible to start the hand shake correction control earlier than the image fluctuation correction device of Variation 2, by a period corresponding to the rotating-angle allowable range "K".

As described above, as the movable ranges of the rotating angles "$\alpha_1$", "$\alpha_2$" of the movable prisms 10A, 10B are established so that the shift angle vectors of the movable prisms 10A, 10B have asymmetrical magnitudes, the movable ranges of the rotating angles "$\alpha_1$", "$\alpha_2$" of the movable prisms 10A, 10B are shifted to the positive (+) side by ΔH. Therefore, it is possible to control the rotating amount of the movable prism 10A within the movable range appropriately so that the hand shake correcting curve 192 does not exceed the movable range.

<Variation 4>

We hereinabove describe the image fluctuation correction device which appropriately controls the rotating amounts of the movable prisms within the predetermined movable ranges so that the rotating amounts of the movable prisms required for correcting the fluctuation of an image do not exceed the movable ranges, as an example of embodiments of the present invention.

In Variation 4, we herein describe an image fluctuation correction device which controls the rotating amounts of the movable prisms within the predetermined movable ranges more appropriately by adjusting the initial positions of the movable prisms in advance of starting the hand shake correction.

Figure 20:
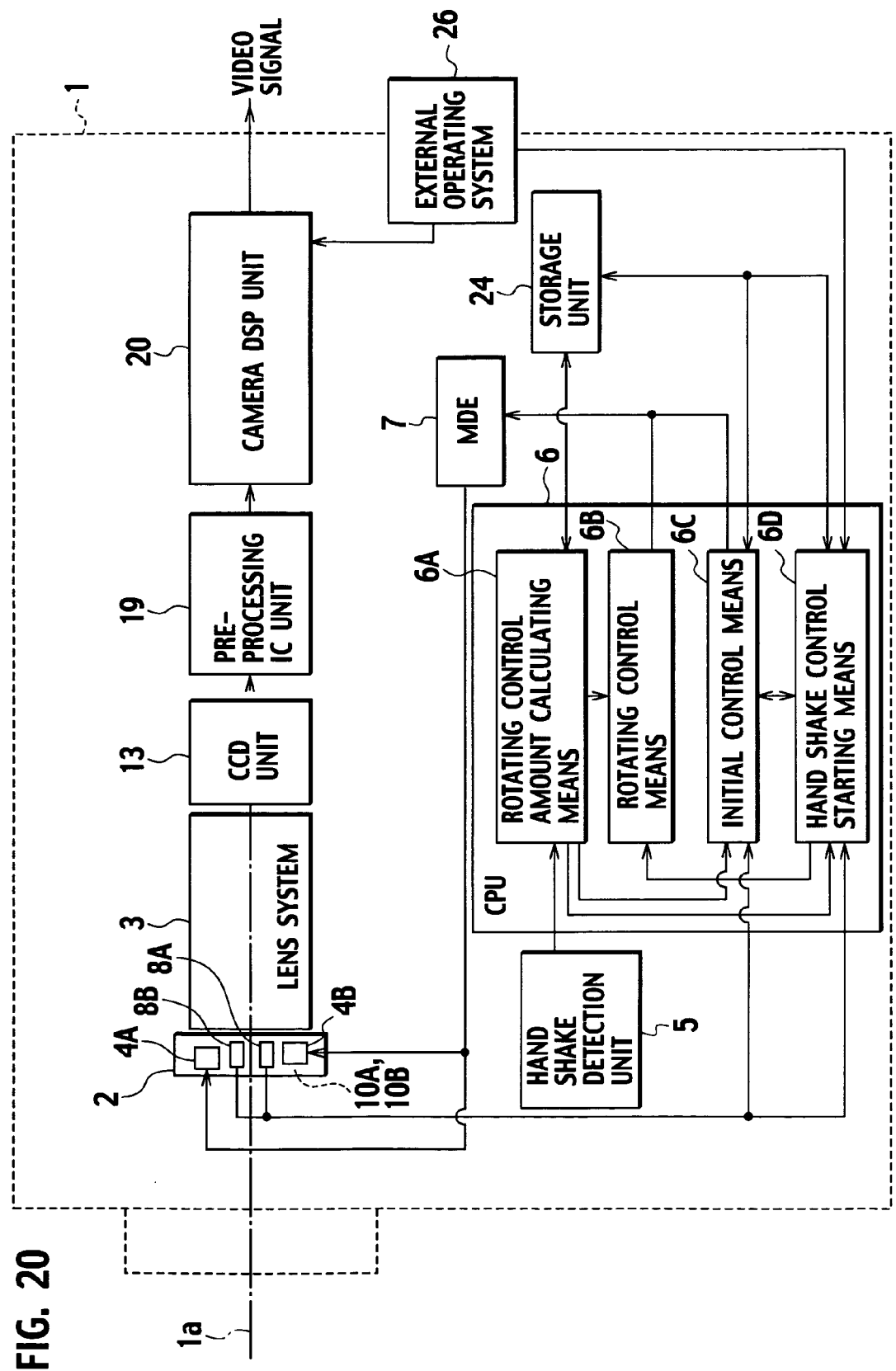
FIG. 20 is a block diagram showing the function and constitution of the image fluctuation correction device in accordance with variation 4 of this embodiment.

FIG. 20 is a block diagram showing the function and constitution of the image fluctuation correction device in accordance with Variation 4.

As shown in FIG. 20, the image fluctuation correction device in accordance with Variation 4 is characterized by including, in addition to the constituents of the image fluctuation correction device of FIG. 1, an initial control means 6C that calculates the amplitudes of rotating control amount from both maximum and minimum values within the predetermined period calculated by the rotating control amount calculating means 6A, calculates rotating-angle start set values "K" by multiplying the calculated amplitudes by a predetermined set-value amplitude multiple number, and controls the actuators 4A, 4B initially so that the rotating angles "$\alpha_{10}$", "$\alpha_{20}$" brought from the sensors 8A, 8B become equal to the rotating-amount start set values "$\Delta_1$", "$\Delta_2$", respectively. Further, the image fluctuation correction device of Variation 4 is characterized in that after receiving the command signal of starting the hand shake correction by the outside operation, the hand shake control starting means 6D transmits the initial control starting signal for starting the initial control of the actuators 4A, 4B to the initial control means 6C, and also transmits the hand shake control starting signal for starting the control of the actuators 4A, 4B to the rotating control means 6B when the rotating angles "$\alpha_{10}$", "$\alpha_{20}$" calculated by the rotating control amount calculating means 6A become equal to the rotating-amount start set values "$\Delta_1$", "$\Delta_2$" calculated by the initial control means 6C, respectively.

Figure 21:
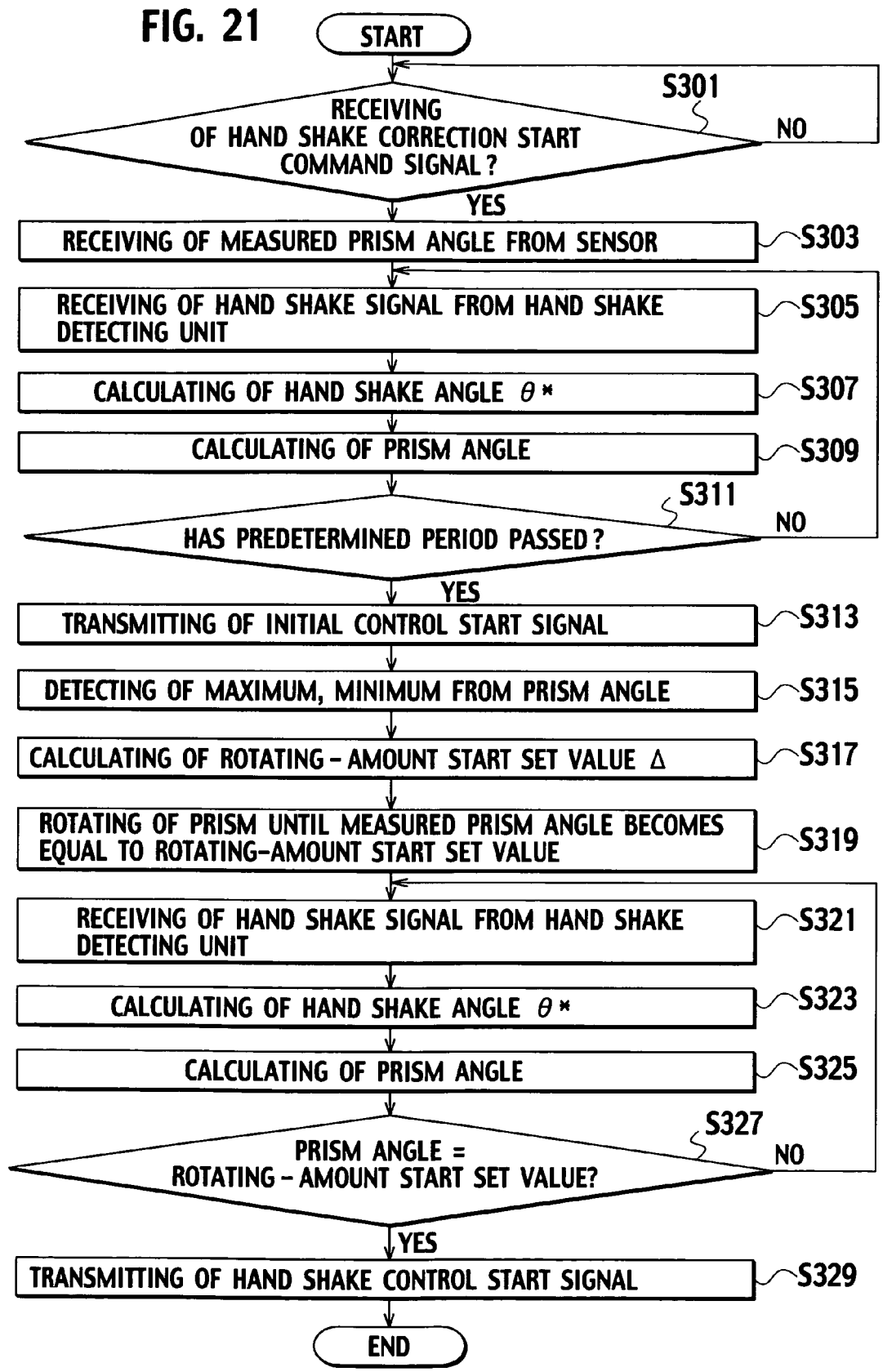
FIG. 21 is a flow chart showing the process flow of the image fluctuation correction device in accordance with variation 4.

FIG. 21 is a flow chart showing the process flow of the image fluctuation correction device in accordance with Variation 4.

First of all, when receiving a command signal of starting the hand shake correction by a user's manipulating of push-buttons accepted by the external operating system 26 (step S301), the hand shake control starting means 6D of the CPU 6 calculates rotating angles "$\alpha_{10}$", "$\alpha_{20}$" of the movable prisms 10A, 10B upon receipt of their rotating information detected by the sensors 8A, 8B (step S303).

Then, the hand shake control starting means 6D of the CPU 6 transmits a command of calculating a hand shake angle to the rotating control amount calculating means 6A. Then, receiving the command of calculating the hand shake angle vector "$_{vector}\theta^*$", the rotating control amount calculating means 6A further receives hand shake signals from the hand shake detecting unit 5, and calculates the hand shake angle vector "$\theta^*$" according to the received hand shake signal (steps S305, S307).

Next, based on the hand shake angle vector "$\theta^*$" calculated at step S307, the rotating control amount calculating means 6A calculates the rotating angles "$\alpha_1$", "$\alpha_2$" of the movable prisms 10A, 10B required to correct the hand shake (step S309).

In detail, the hand shake detecting unit 5 detects a camera shake of the video camera 1 due to hand shake, and outputs the detected shake in the form of hand shake signals to the rotating control amount calculating means 6A of the CPU 6. Based on the hand shake signals, the rotating control amount calculating means 6A of the CPU 6 calculates a hand shake angle vector "$_{vector}\theta$" representing both shake's magnitude and direction by the calculating equations (27), (28).

Then, the rotating control amount calculating means 6A of the CPU 6 calculates the components "$\alpha_1$", "$\alpha_2$" of the rotating angle vector "$_{vector}\alpha$", based on the equations (15) to (21).

Next, until a predetermined period has passed, the rotating control amount calculating means 6A of the CPU 6 stores the calculated rotating angles "$\alpha_1$", "$\alpha_2$" and also times associated with the calculations in the storage unit 24 sequentially (step S311). Here, it should be noted that the above predetermined period for storing the rotating angles "$\alpha_1$", "$\alpha_2$" in the storage unit 24 has to be previously established at least more than a half of hand shake cycle so as to contain maximum and minimum values of the oscillation of hand shake.

Next, the hand shake control start judgment process by the image fluctuation correction device in accordance with variation 4 will be described.

《Hand Shake Control Start Judgment Process》

The hand shake control starting means 6D of the CPU 6 judges whether the hand shake correction control should be started or not (steps S313 to S327).

In detail, firstly, the hand shake control staring means 6D of the CPU 6 transmits the initial control start signal for starting the initial control of the actuators 4A, 4B to the initial control means 6C (step S313).

The initial control means 6C receiving the initial control start signal extracts a maximum and a minimum from the values of the rotating angles "$\alpha_1$", "$\alpha_2$" stored in the storage unit 24 (step 315).

Next, the initial control means 6C calculates the amplitude of a hand shake from the maximum value and minimum value of the rotating angles "$\alpha_1$", "$\alpha_2$" extracted at step S315, and calculates the rotating-amount start set values "$\Delta_1$", "$\Delta_2$" from the calculated amplitude of the hand shake (step S317).

In detail, the initial control means 6C of the CPU 6 multiplies the amplitude of a hand shake calculated from the maximum value and minimum value of the rotating angles "$\alpha_1$", "$\alpha_2$" by the set-value amplitude multiple number read out of the storage unit 24 thereby to establish the rotating-amount start set values "$\Delta_1$", "$\Delta_2$". This set-value amplitude multiple number may be assignable in between 0 to 1 optionally. Again, the set-value amplitude multiple number is set by an image fluctuation correction device's provider or the like and also stored in the storage unit 24, in advance.

Next, the initial control means 6C of the CPU 6 controls the actuators 4A, 4B so that the rotating angles "$\alpha_{10}$", "$\alpha_{20}$" calculated based on the information about rotating angles brought from the sensors 8A, 8B become equal to the rotating-amount start set values "$\Delta_1$", "$\Delta_2$" (step S319). In this way, the movable prisms 10A, 10B are rotated until their rotating angles "$\alpha_{10}$", "$\alpha_{20}$" reach rotating angles "$\alpha_{100}$", "$\alpha_{200}$" corresponding to the rotating-amount start set values "$\Delta_1$", "$\Delta_2$", respectively.

Next, the hand shake control starting means 6D of the CPU 6 transmits a command of calculating a hand shake angle vector to the rotating control amount calculating means 6A. Then, the rotating control amount calculating means 6A receiving the command of calculating the hand shake angle vector also receives hand shake signals from the hand shake detecting unit 5, and calculates the hand shake angle vector "$_{vector}\theta*$" based on the received hand shake signal. Based on the hand shake angle vector "$_{vector}\theta*$", the rotating control amount calculating means 6A further calculates the rotating angles "$\alpha_1$", "$\alpha_2$" of the movable prisms 10A, 10B required for the hand shake correction (steps S321 to S325).

In detail, the hand shake detecting unit 5 detects camera shakes of the video camera 1 due to hand shake at predetermined intervals, and outputs the detected camera shakes in the form of hand shake signals to the rotating control amount calculating means 6A of the CPU 6. Based on the hand shake signals, the rotating control amount calculating means 6A of the CPU 6 calculates the hand shake angle vector "$_{vector}\theta*$" representing both shake's magnitude and direction by the calculating equations (27) and (28).

Then, the rotating control amount calculating means 6A of the CPU 6 calculates the components "$\alpha_1$", "$\alpha_2$" of the rotating angle vector "$_{vector}\alpha$", based on the equations (15) to (21).

Next, the hand shake control starting means 6D of the CPU 6 compares the rotating angles "$\alpha_1$", "$\alpha_2$" of the movable prisms 10A, 10B calculated by the rotating control amount calculating means 6A with the rotating angles "$\alpha_{100}$", "$\alpha_{200}$" corresponding to the rotating-amount start set values "$\Delta_1$", "$\Delta_2$" (step S327).

Then, when it is judged that the rotating angles "$\alpha_1$", "$\alpha_2$" have become equal to the rotating angles "$\alpha_{100}$", "$\alpha_{200}$" respectively, the hand shake control starting means 6D of the CPU 6 transmits an initial control stop signal to the initial control means 6C, and transmits a hand shake control start signal for starting the control of the actuators 4A, 4B to realize the rotating angles calculated by the rotating control amount calculating means 6A, to the rotating control means 6B (step S329).

FIG. 22 includes views explaining a hand shake control start judgment process of the image fluctuation correction device in accordance with Variation 4. FIG. 22(a) shows the hand shake angle "$\theta*$" with respect to a time t, which is required for the movable prisms 10A, 10B to correct the fluctuation of an image. FIG. 22(b) shows the hand shake angle "$\theta*$" as a result that the hand shake correction control is started by the image fluctuation correction device of this embodiment.

Here, it should be noted that the image fluctuation correction device of this embodiment is adapted so as to drive the movable prisms 10A, 10B in the vertical and horizontal directions, independently. Therefore, the hand shake angles "$\theta*$" in the vertical and horizontal directions are calculated independently of each other, for the hand shake start judgment process. However, for the sake of shorthand, FIG. 22 only illustrates the hand shake angle "$\theta*$" in the vertical direction, which is to be corrected by the movable prism 10A.

In FIG. 22(a), a hand shake angle curve 221 represents the hand shake angle "$\theta*$" with respect to a time "t", which is required for the movable prism 10A to correct the fluctuation of an image. Due to the above-mentioned asymmetry property in the synthetic image shift angle vectors, the oscillation center of the hand shake angle curve 221 is shifted to the positive (+) side from a correction-zero position of the hand shake angle, by $\Delta H$.

At the time T1, when receiving the hand shake correction start command signal due to an outside operation by a user etc., the CPU 6 starts the hand shake control start judgment process.

First of all, as shown in FIG. 22(b), the rotating control amount calculating means 6A of the CPU 6 receives the rotating information about the movable prism 10A detected by the sensor 8A at the time T1, and obtains the value of the rotating angle "$\alpha_{10}$" corresponding to "c0". Note that "c0" denotes an initial position of the movable prism 10A at the time of receiving the hand shake correction start command signal due to an outside operation by a user etc.

Therefore, the hand shake control starting means 6D of the CPU 6 transmits a command of allowing the rotating control amount calculating means 6A to calculate the hand shake angle. At the time "T1" and thereafter, the rotating control amount calculating means 6A receives the hand shake signals from the hand shake detecting unit 5 at predetermined intervals, and calculates the hand shake angle "$\theta*$" based on the received hand shake angle.

In addition, at the time T1 and thereafter, the rotating control amount calculating means 6A calculates the rotating angle "$\alpha_1$" of the prism 10A required for the hand shake correction based on the calculated hand shake angle "$\theta*$", by the equations (15) to (21).

Next, at the time "T2" when the predetermined period has passed, the hand shake control starting means 6D of the CPU 6 transmits the initial control start signal for starting the initial control of the actuator 4A to the initial control means 6C.

The initial control means 6C receiving the initial control start signal calculates the rotating-amount start set value "$\Delta_1$". At the time "T2" and thereafter, the initial control means 6C performs the initial control of the actuator 4A so that the rotating angle "$\alpha_{10}$" of the prism 10A becomes the rotating angle "$\alpha_{100}$" corresponding to the rotating-amount start set value "$\Delta_1$".

In FIG. 22(b), the rotating angle "$\alpha_{10}$" reaches the rotating angle "$\alpha_{100}$" corresponding to the rotating-amount start set value "$\Delta_1$", at a time "T3".

Next, the hand shake control starting means 6D of the CPU 6 compares the rotating angle "$\alpha_1$" of the movable prism 10A calculated by the rotating control amount calculating means 6A with the rotating angle "$\alpha_{100}$" corresponding to the rotating-amount start set value "$\Delta_1$".

In FIG. 22(b), at the time "T4", the hand shake control starting means 6D of the CPU 6 judges that the rotating angle "$\alpha_{100}$" agrees with the rotating angle "$\alpha_1$", and transmits the hand shake control start signal for starting the control of the actuator 4A to the rotating control means 6B.

Then, by receiving the hand shake control start signal from the hand shake control starting means 6D, the rotating control means 6B of the CPU 6 starts the hand shake correction control.

Consequently, as shown with a hand shake correcting curve 222 of FIG. 22(b), the rotating control means 6B of the CPU 6 starts the hand shake correction control from the time "T4". In addition, as the movable ranges of the rotating angles "$\alpha_1$", "$\alpha_2$" of the movable prisms 10A, 10B are established so that the shift angle vectors of the movable prisms 10A, 10B have asymmetrical magnitudes, the movable ranges of the rotating angles "$\alpha_1$", "$\alpha_2$" of the movable prisms 10A, 10B are shifted to the positive (+) side by ΔH. Consequently, the oscillation center of the hand shake correcting curve 222 coincides with a center of the predetermined movable range of the movable prism 10A, allowing the rotating amount of the movable prism 10A to be appropriately controlled within the movable range so that the hand shake correcting curve 222 does not exceed the movable range.

<Variation 5>

Figure 23:
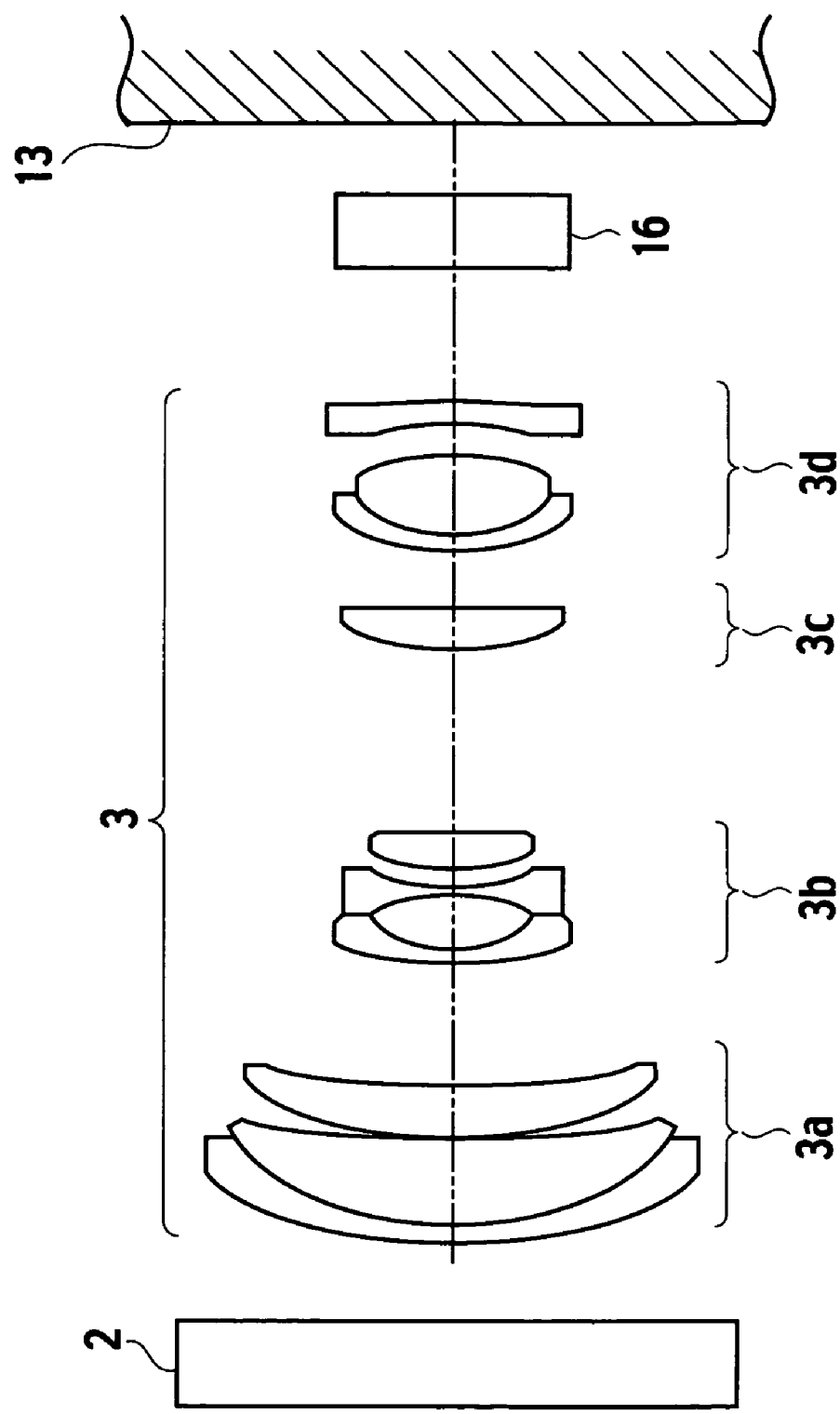
FIG. 23 is a view showing a lens system of FIG. 1.

Although the lens system 3 is expressed in the form of one block in the video camera 1 of this embodiment shown in FIG. 1, the lens system 3 may be formed by a plurality of lenses in group. FIG. 23 is a view showing the lens system 3 of FIG. 1. FIG. 24(a) is a view showing an arrangement where the correction unit 2 is arranged in the lens system 3. FIG. 24(b) is a view showing an arrangement where the correction unit 2 is arranged behind the lens system 3.

The lens system 3 comprises first to fourth lens groups 3a to 3d. Behind the lens system 3, there are an optical low-pass filter 16 for suppressing noise (false signal) and the CCD unit 13 for imaging a subject image.

In FIG. 1, the correction unit 2 is arranged in front of the lens system 3 as shown in FIG. 23. However, the correction unit 2 may be arranged inside the lens system 3, as shown in FIG. 24(a). Alternatively, as shown in FIG. 24(b), the correction unit 2 may be arranged behind the lens system 3. Consequently, as the correction unit 2 is arranged in a narrow part of light flux during or after its passage through the lens system 3, it is possible to miniaturize the correction unit 2.

Figure 25:
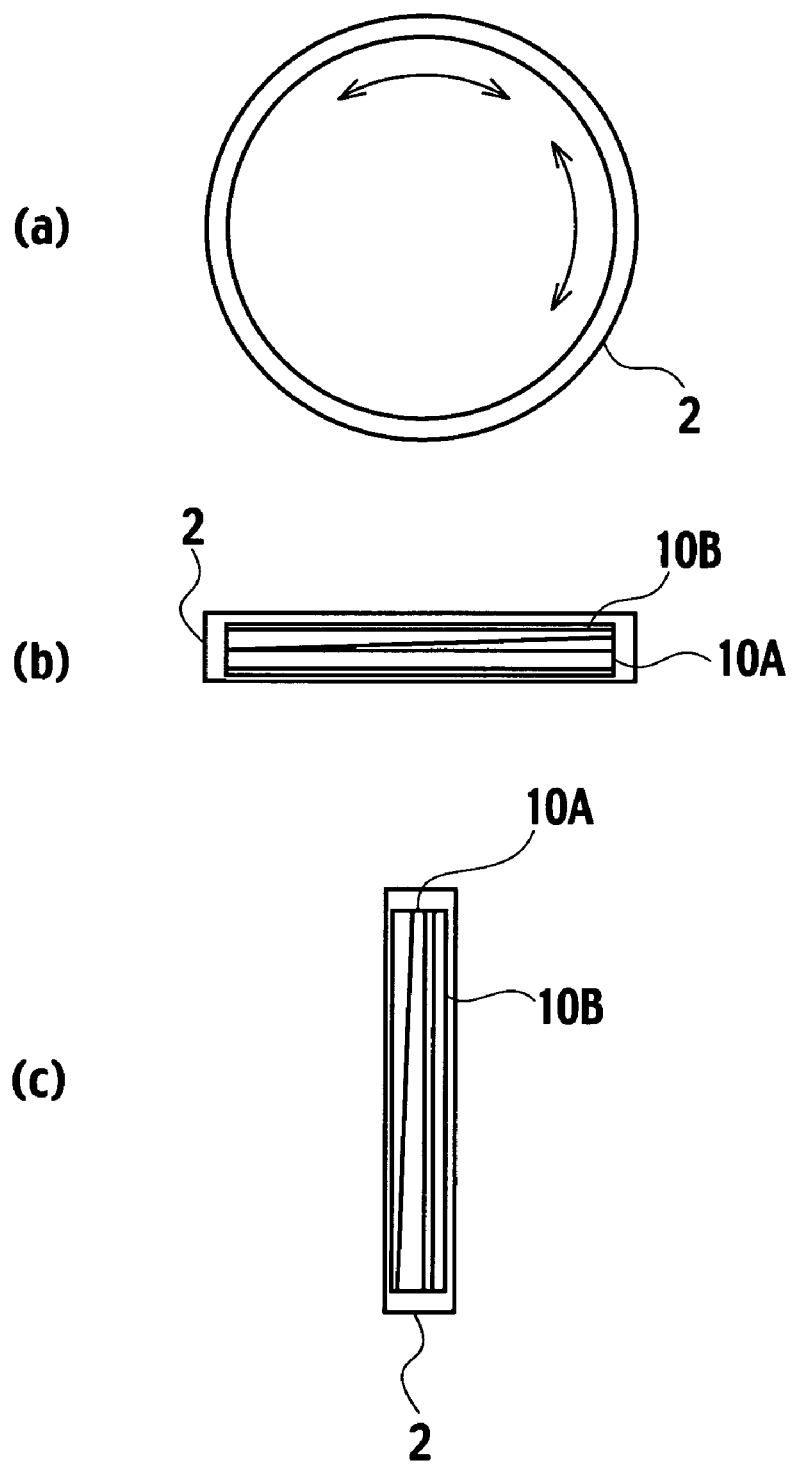

Although the correction unit 2 includes the fixed prism 9 and the movable prisms 10A, 10B as shown in FIG. 3, the fixed prism 9 may be deleted from the device. Alternatively, a further fixed prism may be added to the device. FIG. 25 includes views showing a correction unit with no fixed prism, as another form of the correction unit 2. FIG. 25(a) is a front view of the unit, FIG. 25(b) a plan view, and FIG. 25(c) is a side view. In addition, FIG. 26 includes views showing a correction unit with two sheets of fixed prisms. FIG. 26(a) is a front view of the unit, FIG. 26(b) a plan view, and FIG. 26(c) is a side view.

In the arrangement of FIG. 26, the positions of respective prisms are adjusted so that an incident angle becomes equal to an emitting angle about the correction unit 2 in the initial state. In common with FIGS. 25 and 26, the other operations are similar to those in the above-mentioned embodiment. Accordingly, the similar effects would be provided in this case.

As the arrangement of FIG. 25 is provided with two movable prisms 10A, 10B only, the image is shifted in the initial state by the image shift angle θ, as obvious from FIG. 8(b). However, such a condition does not have direct connection with the image fluctuation correction.

However, it should be noted that the arrangement of FIG. 25 deleting the fixed prism 9 causes the image shift due to chromatic aberration to be increased in comparison with the arrangements of FIGS. 3 and 26. That is, although the correction unit 2 in common with FIGS. 3 and 26 is constructed so that the fixed prism 9 makes an incident angle on the unit 2 equal to the emitting angle in the initial state, the arrangement comes from the purpose of minimizing the influence of prism effect at the image fluctuation correction on the chromatic aberration thereby to reduce an amount of the image shift correction derived therefrom. On the contrary, as the correction unit of FIG. 25 eliminates the fixed prism 9, the incident angle does not become equal to the emitting angle in the initial state. Comparing with the arrangements of FIGS. 3 and 26, therefore, the image shift due to chromatic aberration gets larger. On the other hand, the arrangement of FIG. 25 with no fixed prism allows a length of the correction unit 2 in the direction of the optical axis to be shortened, realizing its miniaturization.

Alternatively, the device may be designed so as to strike a balance between the effect of reducing the correction amount against the image shift due to chromatic aberration and the effect of miniaturizing the correction unit 2. Then, the correction amount of the image shift due to chromatic aberration is not so great as that of FIG. 25, while the correction unit 2 can be small-sized in comparison with the units of FIGS. 3 and 26. That is, the prism angle of the fixed prism 9 may be adjusted so that the amount of the image shift due to chromatic aberration is located midway between the image shift of FIG. 25 and that of FIGS. 3 and 26. With this adjustment, it is possible to strike a balance between the effect of reducing the correction amount against the image shift due to chromatic aberration and the effect of miniaturizing the correction unit 2.

In addition, each of the prisms in the embodiments of FIGS. 3, 25 and 26 may be provided in the form of a simplex prism or a compound prism. Alternatively, the prism may be formed by a parallel plate having prism effect FIG. 27(a) is a view showing such a simplex prism, FIG. 27(b) a view of such a compound prism, and FIG. 27(c) is a view showing such a parallel plate having prism effect.

For instance, as shown in FIG. 27(b), the movable prism 10A may be provided in the form of a compound prism produced by bonding two sheets of prisms 10Aa, 10Ab with minute angles. In case of this compound prism, it is possible to greaten an angle of each prism body, facilitating a production of a minute-angle prism that could be formed by a simplex prism with difficulty.

Further, as shown in FIG. 27(c), each prism may be replaced by a parallel plate 17 having prism effect with a refraction index N changed from N=1.5 to N=1.4. Although the prism is usually required to control its inclination angle in the course of production, the provision of the parallel plate 17 would facilitate a processing of the prism.

INDUSTRIAL APPLICABILITY

According to the image fluctuation correction device of the present invention, it is possible to appropriately control the rotating amounts of the movable refraction elements within the predetermined movable ranges in a manner that the rotating amounts of the movable refraction elements required to correct the fluctuation of an image do not exceed their movable ranges.

The invention claimed is:

1. An image fluctuation correction device that corrects a fluctuation of an image caused by an on-camera shake of an imaging equipment having an optical lens, the image fluctuation correction device comprising:

shake detecting means for detecting a horizontal or vertical shake generated in the imaging equipment thereby to output a shake signal based on the detected shake;

a first movable refraction element arranged on an incident light path toward the optical lens to change a refracting direction of light being incident on the optical lens to a horizontal direction and a second movable refraction element arranged on the incident light path toward the optical lens to change the refracting direction of light being incident on the optical lens to a vertical direction;

a fixed refraction element arranged on the incident light path toward the optical lens;

first rotating means for rotating the first movable refraction element within a predetermined movable range defining a clockwise direction and a counterclockwise direction toward the incident direction of light on the optical lens, as a positive direction and a negative direction, respectively;

second rotating means for rotating the second movable refraction element within a predetermined movable range defining a counterclockwise direction and a clockwise direction toward the incident direction of light on the optical lens, as a positive direction and a negative direction, respectively;

rotating control amount calculating means for calculating rotating control amounts of the first and second rotating means so as to cancel the horizontal or vertical shake detected by the shake detecting means; and rotating control means for controlling the first and second rotating means based on the rotating control amounts calculated by the rotating control amount calculating means, wherein the movable ranges are defined by rotating amounts each from a positive-directional maximum rotating amount, which represents a maximum rotating amount in the positive direction when a first-quadrant image shift angle vector defined by the rotating amounts of the first and second movable refraction elements rotated to the positive direction coincides with a third-quadrant image shift angle vector defined by the rotating amounts of the first and second movable refraction elements rotated to the negative direction, up to a maximum negative-directional rotating amount, which represents a maximum rotating amount in the negative direction when a length of the first-quadrant image shift angle vector coincides with a length of the third-quadrant image shift angle vector.

2. The image fluctuation correction device of claim 1, further comprising:

rotating amount detecting means for detecting a rotating amount of at least one of the first and the second movable refraction elements; and hand shake control starting means for transmitting a hand shake control starting signal for starting control of at least one of the first and the second rotating means to the rotating control means after receiving a hand shake correction start command signal through an outside operation, either when the rotating amount detected by the rotating amount detecting means agrees with the rotating control amount calculated by the rotating control amount calculating means or when the absolute value of a difference between the rotating amount and the rotating control amount becomes minimized.

3. The image fluctuation correction device of claim 1, further comprising:

rotating amount detecting means for detecting a rotating amount of at least one of the first and the second movable refraction elements;

initial control means that calculates an amplitude of the rotating control amount from both maximum and minimum values in a predetermined period calculated by the rotating control amount calculating means, calculates a rotating-angle start set value by multiplying the calculated amplitude by a predetermined set-value amplitude multiple number, and controls at least one of the first and the second rotating means initially so that the rotating amount detected by the rotating amount detecting means becomes equal to the rotating-amount start set value; and hand shake control starting means that transmits an initial control starting signal for starting an initial control of the rotating means to the initial control means after receiving a hand shake correction start command signal through an outside operation, and transmits a hand shake control starting signal for starting control of at least one of the first and the second rotating means to the rotating control means when the rotating control amount calculated by the rotating control amount calculating means becomes equal to the rotating-amount start set value calculated by the initial control means.

* * * * *